US011012365B2

(12) United States Patent
McGrath et al.

(10) Patent No.: US 11,012,365 B2
(45) Date of Patent: May 18, 2021

(54) CHANGING A TIME SENSITIVE NETWORKING SCHEDULE IMPLEMENTED BY A SOFTSWITCH

(71) Applicant: Intel Corporation, Santa Clara, CA (US)

(72) Inventors: Michael McGrath, Virginia (IE); Michael Nolan, Maynooth (IE); Marcin Spoczynski, Leixlip (IE); Dáire Healy, Enfield (IE); Stiofáin Fordham, Maynooth (IE)

(73) Assignee: Intel Corporation, Santa Clara, CA (US)

( * ) Notice: Subject to any disclaimer, the term of this patent is extended or adjusted under 35 U.S.C. 154(b) by 25 days.

(21) Appl. No.: 16/586,391

(22) Filed: Sep. 27, 2019

(65) Prior Publication Data
US 2020/0028791 A1 Jan. 23, 2020

(51) Int. Cl.
*H04L 12/875* (2013.01)
*H04L 12/24* (2006.01)
*H04L 12/931* (2013.01)
*H04L 12/937* (2013.01)
*H04L 12/841* (2013.01)
(Continued)

(52) U.S. Cl.
CPC .......... *H04L 47/564* (2013.01); *H04L 41/145* (2013.01); *H04L 49/254* (2013.01); *H04L 49/70* (2013.01)

(58) Field of Classification Search
None
See application file for complete search history.

(56) References Cited

U.S. PATENT DOCUMENTS 9,600,386 B1 * 3/2017 Thai .................. H04L 67/10
2013/0326058 A1 * 12/2013 Brady ............... H04L 43/0876
709/224

(Continued)

OTHER PUBLICATIONS

"Methodology for Transforming to Cloud CPE", Juniper Networks, 2017, 11 pages. (Year: 2017).*

(Continued)

*Primary Examiner* — Sai Aung
*Assistant Examiner* — Liem H. Nguyen
(74) *Attorney, Agent, or Firm* — Hanley, Flight & Zimmerman, LLC

(57) ABSTRACT

Example methods, apparatus, systems and articles of manufacture (e.g., physical storage media) to change a time sensitive networking schedule implemented by a softswitch are disclosed. Example apparatus disclosed herein to change a time sensitive networking schedule implemented by a first softswitch on a compute node include a network node configurator to deploy a second softswitch on the compute node based on a first configuration specification associated with the first softswitch, configure the second softswitch to implement an updated time sensitive networking schedule different from the time sensitive networking schedule implemented by the first softswitch, and replace the first softswitch with the second softswitch in response to a determination that a first set of constraints is met for simulated network traffic processed by the second softswitch based on the updated time sensitive networking schedule. Disclosed example apparatus also include a simulator to apply the simulated network traffic to the second softswitch.

25 Claims, 15 Drawing Sheets

(51) Int. Cl.
*H04L 12/853* (2013.01)
*H04L 12/26* (2006.01)

(56) References Cited

U.S. PATENT DOCUMENTS

| | | | | |
|---|---|---|---|---|
| 2014/0298327 | A1* | 10/2014 | Khatri | G06F 9/5077 |
| | | | | 718/1 |
| 2016/0299783 | A1* | 10/2016 | Combellas | H04L 67/1008 |
| 2019/0056972 | A1* | 2/2019 | Zhou | G06F 11/3476 |
| 2019/0097946 | A1* | 3/2019 | Lokman | H04L 45/306 |
| 2019/0173764 | A1* | 6/2019 | Di Martino | H04L 41/145 |
| 2019/0253339 | A1* | 8/2019 | Mehmedagic | H04L 45/121 |
| 2019/0306084 | A1* | 10/2019 | Suzuki | H04L 49/30 |
| 2020/0267072 | A1* | 8/2020 | Prasad | G06F 9/45558 |

OTHER PUBLICATIONS

"Transforming the Telco Central Office with NFV and SDN", Arista White Paper, 2017, 10 pages. (Year: 2017).*

Dhingra, "Multicasting in Network Function Virtualization (NFV) Environment", Iowa State University Digital Repository, 2018, 27 pages. (Year: 2018).*

Piramanayagam et al., "Precise Timing Analysis of Open vSwitch for Hard Real-Time Applications," Information Trust Institute, 2015, 1 page.

Qian et al., "A Linux Real-Time Packet Scheduler for Reliable Static SDN Routing," 29th Euromicro Conference on Real-Time Systems, 2017, 22 pages.

Fang et al., "Virtual Switch Supporting Time-Space Partitioning and Dynamic Configuration for Integrated Train Control and Management Systems," 21st Euromicro Conference on Digital System Design, 2018, 5 pages.

Ditzel, III et al., "Time Sensitive Network (TSN) Protocols and Use in EtherNet/IP Systems," ODVA Industry Conference & 17th Annual Meeting, Oct. 13-15, 2015, 24 pages.

Farkas et al., "Time-Sensitive Networking Standards," IEEE Communications Standards Magazine, Jun. 2018, 2 pages.

"Network Functions Virtualisation (NFV) Release 2; Protocols and Data Models; NFV Descriptors based on TOSCA Specification," ETSI, Dec. 2018, 205 pages.

* cited by examiner

```
158 ─┐

SMT_constraint_solver_sample_doc: sample VNFD for description: Constraints required for SMT-based
             scheduler dependant on network
             characteristics metadata:
  dec_name: constraints-for-SMT-based-scheduler topology:                                       ┌─ 605
  node:
    type: smt.nodes.vnfd
    capabilities:
      nfv_compute:
        properties:
          count: 15
          topology: 'star'
          num_cpu: 1
          cpu: 3.5
          ram: 30 MB
          disk_size: 1 TB
                                                ┌─ 610
constraints:
  hop-delay: 1.0
  mem-bound: 50.0
  frame-spacing: 1.0
  num_distinct_groupings: 2
  total_time_avail: 15000
```

INPUT ← OBSERVED TEST FRAMES METRICS, SCHEDULE REQS
SCHEDSAT ← TRUE
FOR EACH FRAME $i$ IN TRAFFIC DO
    FOR FOR EACH FRAME INSTANCE $j$ IN $FRAME_i$ DO
        IF $FRAME_i INSTANCE_j$ !SATISFY SCHEDULE REQUIREMENTS THEN
            SCHEDSAT ← FALSE
            RETURN SCHEDSAT
        END IF
    END FOR
END FOR
RETURN SCHEDSAT

CHANGING A TIME SENSITIVE NETWORKING SCHEDULE IMPLEMENTED BY A SOFTSWITCH

FIELD OF THE DISCLOSURE

This disclosure relates generally to time sensitive networking and, more particularly, to changing a time sensitive networking schedule implemented by a softswitch.

BACKGROUND

Time sensitive networks include network devices (also referred to herein as network elements) that interoperate to provide, among other things, time synchronization and packet scheduling to, for example, ensure one or more latency targets for packets sent from one network device to another network device are met. For example, industrial control applications may rely on such network latency target(s) being met to achieve proper operation of the industrial equipment being controlled. Time sensitive networks utilize a time sensitive networking schedule that is created based on the actual topology of the network and application latency requirements. The time sensitive networking schedule is implemented by the network devices. When the network topology changes and/or new applications are deployed in the time sensitive network, an updated time sensitive networking schedule is created and provided to the network devices for implementation.

BRIEF DESCRIPTION OF THE DRAWINGS

FIG. 6 illustrates an example virtualized industrial function descriptor processed by the central configuration controller of FIG. 1.

Figure 1:
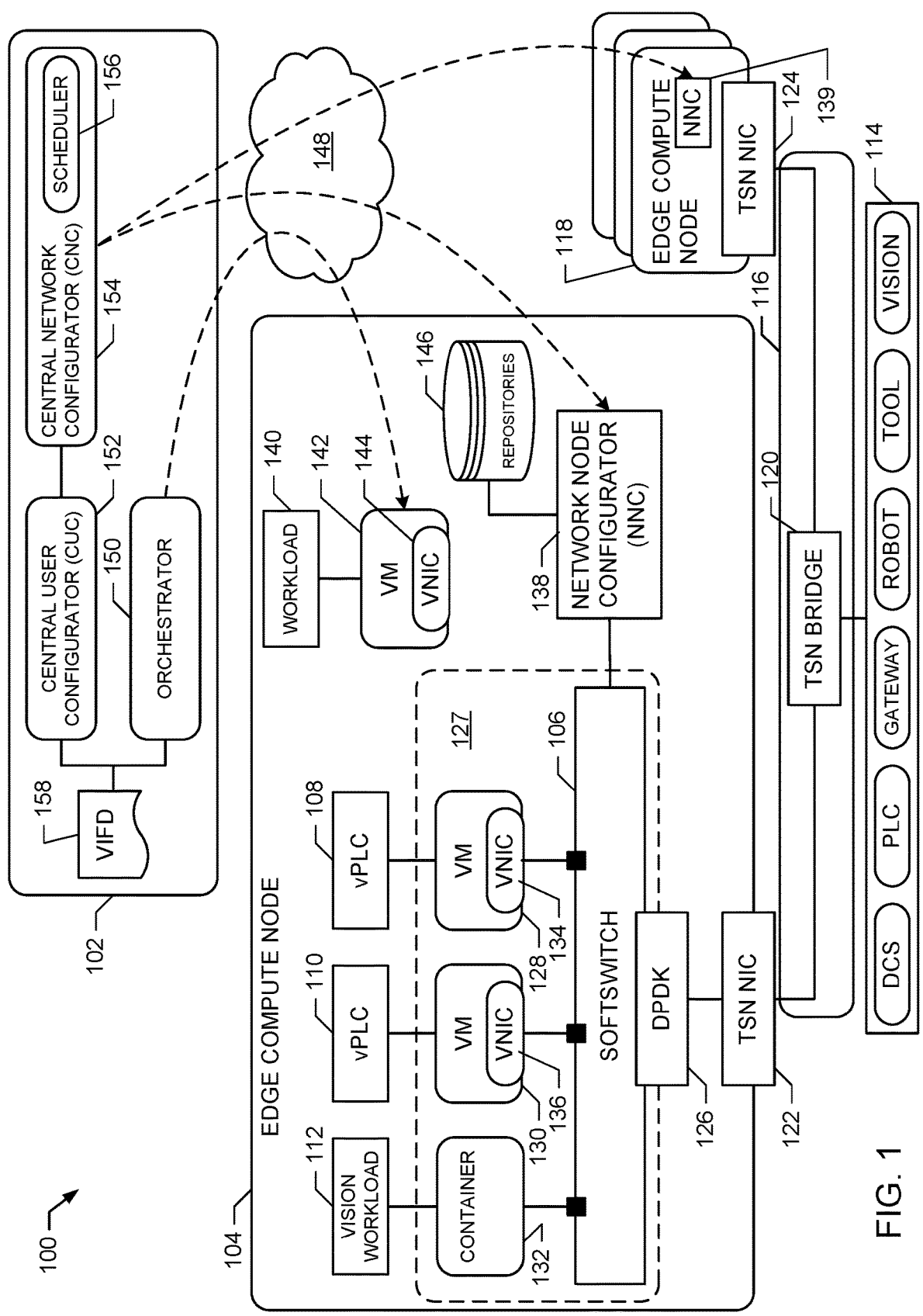
FIG. 1 is a block diagram of an example environment of use including an example central configuration controller and an example network node configurator to change a time sensitive networking schedule implemented by an example softswitch of a compute node in accordance with teachings of this disclosure.

The figures are not to scale. In general, the same reference numbers will be used throughout the drawing(s) and accompanying written description to refer to the same or like parts, elements, etc. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Example methods, apparatus, systems and articles of manufacture (e.g., physical storage media) to change a time sensitive networking schedule implemented by a softswitch are disclosed herein. Example apparatus disclosed herein to change a time sensitive networking schedule implemented by a first softswitch on a compute node include an example network node configurator to deploy a second softswitch on the compute node based on a first configuration specification associated with the first softswitch. The example network node configurator is also to configure the second softswitch to implement an updated time sensitive networking schedule different from the time sensitive networking schedule implemented by the first softswitch. The example network node configurator is further to replace the first softswitch with the second softswitch in response to a determination that a first set of constraints is met for simulated network traffic processed by the second softswitch based on the updated time sensitive networking schedule. Such disclosed example apparatus also include an example traffic simulator to apply the simulated network traffic to the second softswitch.

In some disclosed examples, the first softswitch is to communicate with respective first ports (also referred to herein as port connections) of corresponding ones of a first set of virtual machines on the compute node to provide the first set of virtual machines with access to a network that implements time sensitive networking. In some such disclosed examples, to replace the first softswitch with the second softswitch, the network node configurator is to: (i) connect the second softswitch to a network interface of the compute node, (ii) add respective second ports to corresponding ones of the first set of virtual machines, (iii) bind the respective second ports of the corresponding ones of the first set of virtual machines to the second softswitch, (iv) delete the respective first ports of the corresponding ones of the first set of virtual machines, and (v) delete the first softswitch from the compute node.

In some disclosed examples, the updated time sensitive networking schedule is to support deployment of a new virtual machine, which hosts a latency sensitive workload, to the compute node. In some such disclosed examples, the network node configurator is to: (i) connect a port of the new virtual machine to the second softswitch, (ii) configure the workload to operate in a test mode, (iii) monitor metrics associated with the simulated network traffic processed by the second softswitch, and (iv) configure the workload to operate in an operational mode after the determination that the first set of constraints is met for the simulated network traffic processed by the second softswitch based on the updated time sensitive networking schedule. In some such disclosed examples, the simulated network traffic includes first simulated network traffic associated with a first set of virtual machines on the compute node and second simulated network traffic associated with the new virtual machine. For example, the first set of virtual machines may be in communication with the first softswitch, and the first simulated traffic may correspond to previously monitored network traffic obtained during operation of the first set of virtual machines.

In some disclosed examples, the network node configurator is to delete the second softswitch and the updated time sensitive networking schedule from the compute node in response to a determination that the first set of constraints is not met for the simulated network traffic processed by the second softswitch based on the updated time sensitive networking schedule.

In some disclosed examples, the second softswitch is associated with a second configuration specification, which is to correspond with the first configuration specification when the second softswitch is initially deployed on the compute node. In some such examples, in response to the determination that the first set of constraints is met for the simulated network traffic, the network node configurator is to adjust the second configuration of the second softswitch to satisfy at least one of a second set of constraints to be met for the simulated network traffic processed by the second softswitch based on the updated time sensitive networking schedule. For example, the network node configurator may iteratively adjust the second configuration of the second softswitch to satisfy other ones of the second set of constraints to be met for the simulated network traffic until a time limit is reached.

Other example apparatus disclosed herein to change a time sensitive networking schedule implemented by a softswitch on a compute node include an example central user configurator to parse a virtualized industrial function descriptor corresponding to a virtualized workload to determine a set of parameters for an updated time sensitive networking schedule to be implemented by the softswitch. Such disclosed example apparatus also include an example central network configurator to determine the updated time sensitive networking schedule based on the set of parameters, and send the updated time sensitive networking schedule to the compute node.

Some such disclosed example apparatus also include an example orchestrator to parse the virtualized industrial function descriptor to determine a virtual machine configuration specification for a virtual machine to deploy on the compute node to host the virtualized workload. In some examples, the orchestrator is to send the virtual machine configuration specification to the compute node to cause the virtual machine to be deployed on the compute node. In some examples, the orchestrator is further to delete the virtual machine from the compute node in response to a message from the compute node indicating a first set of constraints is not met by the updated time sensitive networking schedule.

In some disclosed examples, the central user configurator is to delete the updated time sensitive networking schedule in response to a message from the compute node indicating a first set of constraints is not met by the updated time sensitive networking schedule.

In some disclosed examples, the central user configurator is to determine whether the central network configurator supports generation of the updated time sensitive networking schedule based on a first one of the set of parameters. In some such examples, the central user configurator is to discard the first one of the set of parameters, or replace the first one of the set of parameters with a different parameter, when the central network configurator does not support generation of the updated time sensitive networking schedule based on the first one of the set of parameters.

These and other example methods, apparatus, systems and articles of manufacture (e.g., physical storage media) to change a time sensitive networking schedule implemented by a softswitch are disclosed in further detail below.

As mentioned above, time sensitive networks include network elements that interoperate to provide, among other things, time synchronization and scheduling to, for example, ensure one or more latency targets for packets sent from one network element to another network element are met. For example, network elements that implement a time sensitive network may be structured to implement a time sensitive networking (TSN) schedule in accordance with a defined standard, such as the Institute of Electrical and Electronics Engineers (IEEE) 802.1Qbv Standard, published on Mar. 18, 2016. The TSN schedule specified by the IEEE 802.1Qbv Standard utilizes a gate structure and corresponding packet classifications to support strictly timed packet transmission slots. Interest in time sensitive networks is increasing due to their ability to ensure packet latency targets are met on an open standards-based network (as compared to a proprietary network). For example, industrial control applications may rely on deterministic packet latency distributions with a known upper latency bound (e.g., such as 31.25 microseconds, or some other bound) for the isochronous, real-time network traffic generated by a given control function, such as a programmable logic controller (PLC), a motion controller, a numerical controller, etc.

There is also interest in the use of softswitches to implement network elements that provide access to an underlying network. For example, the use of softswitches in cloud computing environments is becoming the norm. A softswitch can be a virtual switch that is implemented by one or more virtual network functions (VNFs) that execute on a compute node, such as a server, a router, a cloud host, etc. As such, the terms softswitch, virtual switch, vSwitch, etc., are synonymous and can be used interchangeably unless noted otherwise For example, interest in the use of softswitches in industrial applications is being driven, at least in part, by customer interest in the use of virtualized industrial functions (VIFs) to implement the workloads to control industrial equipment, and in the horizontal consolidation of the VIFs on edge compute nodes located at or near the sites where the equipment is to be controlled. Softswitches can be used in such examples to provide network connectivity between the VIF workloads on a compute node and the external equipment being controlled. Softswitches can also provide network connectivity between the VIF workloads on the compute node itself.

Thus, in addition to implementing softswitches that support the flexible workload deployments and removal operations associated with such network function virtualization (NFV) environments, there is a need for softswitches that can support TSN. However, existing softswitches may not be able to support TSN, especially for applications, such as industrial control applications, with strict latency targets. For example, in an IEEE 802.1Qbv implementation, the TSN schedule for a given time sensitive network is determined based on the actual topology of the network. When a new VIF workload, with its associated deterministic and real-time packet cycle times, is to be deployed on a customer's edge compute node (or cluster), an updated TSN schedule is created to accommodate that new VIF workload in the network. The updated TSN schedule is deployed to the TSN network endpoints. The TSN network endpoints include the TSN-enabled softswitch executing on that compute node to provide first-hop connectivity to the new VIF workload. Existing softswitch implementations may require stopping the softswitch, applying the updated TSN schedule to the softswitch, and then re-initializing/restarting the softswitch to have the updated TSN schedule take effect at the softswitch.

However, the sequence of stopping the softswitch, applying the updated TSN schedule to the softswitch, and then re-initializing/restarting the softswitch may cause existing workloads connected to the softswitch to experience packet communication delays and/or dropouts that exceed the latency target (e.g., 31.25 microseconds, or some other target) of the time sensitive network. To address this technical problem, example technical solutions disclosed herein utilize a duplicate softswitch (also referred to herein as a digital twin softswitch) to enable dynamic changing of a TSN schedule implemented by a softswitch without impacting the deterministic and real-time packet communications associated with existing workloads connected to the softswitch. For example, a change of the TSN schedule may be caused by a new workload being deployed in the time sensitive network. As discussed in further detail below, example technical solutions disclosed herein also utilize the duplicate softswitch (digital twin softswitch) to validate an updated TSN schedule in situ with the new workload being deployed, and can prevent deployment of the updated TSN schedule if a performance issue is detected.

Turning to the figures, a block diagram of an example central configuration controller 102 and an example network node configurator 138 structured to change a time sensitive networking schedule implemented by an example softswitch 106 of a compute node 104 in accordance with teachings of this disclosure is illustrated in FIG. 1 in the context of an example environment of use 100. In the illustrated example, the compute node 104 corresponds to an edge compute node 104 deployed in an industrial environment (e.g., facility, plant, etc.) to execute workloads 108, 110, 112 to control example physical equipment 114 in the industrial environment. For example, the physical equipment can include a distributed control system (DCS), a physical programmable logic controller (PLC), a gateway, a robot, a tool, vision processing equipment, etc. As such, the compute node 104 can be implemented by, for example, any appropriate computing device or combination of computing devices, such as a server in an edge cluster, an industrial computer, etc. In some example, the compute node 104 is implemented by a processor platform such as the example processor platform 1600 of FIG. 16, which is described in further detail below. Although the compute node 104 of the illustrated example is deployed in an industrial environment, in the other examples, the compute node 104 can be deployed in other types of environments. For example, the compute node 104 could correspond to a controller to execute workloads to control fifth generation (5G) small cell sites, cloud center server farms, etc.

In the example environment 100 of FIG. 1, the compute node 104 communicates with the physical equipment 114 via an example time sensitive network 116. In the illustrated example, the time sensitive network 116 connects the compute node 104 with the physical equipment 114 and, in some examples, other example compute node(s) 118 via an example bridge 120. The bridge 120 can be implemented by any network bridge, router, server, device, etc., capable of implementing a TSN schedule (e.g., a TSN schedule in accordance with the IEEE 802.1Qbv Standard). Each of the compute node(s) 118 of the illustrated example can be implemented by any appropriate computing device or combination of computing devices, such as a server in an edge cluster, an industrial computer, etc., which may be similar to, or different from, the computing node 104.

To connect to the time sensitive network 116, the compute node 104 include an example network interface card (NIC) 122. Likewise, the compute node(s) 118 include respective NICs 124. The NICs 122 and 124 can be implemented by any network interface circuitry capable of connecting to the time sensitive network 116. For example, if the time sensitive network 116 is a wired network, such as an Ethernet network, a digital subscriber line (DSL) network, etc., the NICs 122 and 124 can be implemented by appropriate, corresponding wired network interface circuitry. If the time sensitive network 116 is a wireless network, such as a wireless local area network (WLAN), a cellular network, etc., the NICs 122 and 124 can be implemented by appropriate, corresponding wireless network interface circuitry. In the illustrated example of FIG. 1, the softswitch 106 implemented on the compute node 104 communicates with the NIC 122 of the compute node 104 via an example data plane development kit (DPDK) 126. The DPDK provides a set of libraries to enable efficient communication of data packets between the softswitch 106 and the NIC 122.

The softswitch 106 of the compute node 104 corresponds to a virtual switch implemented by one or more virtual network functions (VNFs) to provide the workloads 108, 110, 112 executing on the compute node 104 with access to the time sensitive network 116, which connects the workloads 108, 110, 112 to the physical equipment 114. In some examples, the softswitch 106 also implements an example internal network 127 to allow some or all of the workloads 108, 110, 112 to communicate with each other within the compute node 104. The workloads 108, 110, 112 can correspond to any appropriate workload to control the physical equipment 114, monitor the physical equipment 114, process data returned by the physical equipment 114 for use in other applications, etc. For example, the workloads 108 and 110 correspond to respective example virtual PLCs 108 and 110 executed to control respective physical equipment 114 (e.g., such as respective robots, tools, etc.) in a deterministic and real-time manner. The workload 112 of the illustrated example corresponds to a vision processing workload 112, which is a non-deterministic workload to perform computer vision processing on data returned from one or more of the physical equipment 114. Thus, the softswitch 106 can support deterministic and non-deterministic workloads. In the illustrated example of FIG. 1, the workloads 108, 110, 112 are hosted by respective virtual machines (VMs) and/or containers that interface with the softswitch 106. For example, the workloads 108 and 110 are hosted by respective example VMs 128 and 130, whereas the workload 112 is hosted by an example container 132. As shown in the example of FIG. 1, the VMs 128 and 130 also include respective example virtual NICs (VNICs) 134 and 136 to connect the VMs 128 and 130 with the softswitch 106.

The softswitch 106 of the illustrated example implements a TSN schedule, such as a TSN schedule compliant with the IEEE 802.1Qbv Standard, to transmit and receive data packets as part of the time sensitive network 116. For example, the softswitch 106 may include multiple data buffers (e.g., queues) assigned to different data classes defined by the TSN schedule, which the softswitch 106 gates on and off to provide access to the time sensitive network 116 to meet timing requirements specified by the TSN schedule. To configure the softswitch 106 to implement a TSN schedule deployed to the compute node 104, the compute node 104 includes the example network node configurator 138. The other compute node(s) 118 also include respective example network node configurator(s) 139. As disclosed in further detail below, the network node configurator 138 is also responsible for changing the TSN schedule implemented by the softswitch 106 when an updated TSN schedule is deployed to the compute node 104. The network node configurator 138 is also responsible for validating the updated TSN schedule before deploying the updated TSN schedule for softswitch implementation. For example, an updated TSN schedule may be deployed to the compute node 104 when a new workload, such as an example workload 140, is to be deployed to the compute node 104 for execution. As shown in FIG. 1, the workload 140 may be similar to, or different from, the workloads 108, 110, 112, and may be hosted by an example VM 142 with an example VNIC 144. As described in further detail below, the updated TSN schedule is created to accommodate the packet communication timing requirements of the new workload 140 to be deployed on the compute node 104, as well as the packet communication timing requirements of existing workloads operating in the time sensitive network 116, such as the workloads 108, 110 and 112. As also described in further detail below, the network node configurator 138 utilizes one or more example data repositories 146 to configure the softswitch 106 to implement a TSN schedule, to change the TSN schedule implemented by the softswitch 106, to confirm that an updated TSN schedule is viable before deploying the updated TSN schedule for softswitch implementation, etc. The data repositories 146 can be implemented by any number and/or type(s) of storage devices, memories, etc. For example, the data repositories 146 can be implemented by the example volatile memory 1614 and/or the example mass storage device(s) 1628 of FIG. 16, which are described in further detail below.

The central configuration controller 102 is included in the example environment 100 to deploy workloads and TSN schedules to the compute nodes 104 and 118 in communication with the time sensitive network 116. As such, the central configuration controller 102 communicates with the compute nodes 104 and 118 via an example network 148. The network 148 can be implemented by any number and/or type(s) of communication networks. For example, the communication network 125 can be implemented by one or more wired/cabled networks, one or more wireless networks (e.g., mobile cellular networks, satellite networks, etc.), one or more proprietary networks, one or more public networks (e.g., such as the Internet), etc., or any combination thereof. In the illustrated example, the network 148 is different from the time sensitive network 116 that connects the compute nodes 104 and 118 with the physical equipment 114.

The central configuration controller 102 can be implemented by, for example, any appropriate computing device or combination of computing devices. In some example, the central configuration controller 102 is implemented by a processor platform such as the example processor platform 1500 of FIG. 15, which is described in further detail below. In the illustrated example of FIG. 1, the central configuration controller 102 includes an example orchestrator 150 to deploy workloads to the compute nodes 104 and 118. The central configuration controller 102 of the illustrated example also includes an example central user configurator 152 and an example central network configurator 154 to configure the time sensitive network 116. For example, the central network configurator 154 includes an example scheduler 156 to create TSN schedules to be deployed to the network nodes 104 and 118 to implement the time sensitive network 116. As described in further detail below, the workloads and TSN schedules are created based on example virtualized industrial function descriptors (VIFD) 158 that specify the instantiation parameters, operational behaviors, network communication requirements, etc., for the workloads to be deployed to the compute nodes 104 and 118. An example procedure performed by the central configuration controller 102 and the network node configurator 138 to change a TSN schedule implemented by the softswitch 106 of the compute node 104 is described in further detail below in connection with FIGS. 1-5. An example VIFD 158 is illustrated in FIG. 6, which is also described in further detail below.

With reference to FIG. 1, an example procedure performed by the central configuration controller 102 and the network node configurator 138 to change a TSN schedule implemented by the softswitch 106 of the compute node 104 begins with the central configuration controller 102 receiving the VIFD 158 for the new workload 140 to be deployed to the compute node 104. As noted above, the VIFD 158 specifies the instantiation parameters, operational behaviors, network communication requirements, etc., for the new workload 140. In some examples, the VIFD 158 is an enhancement of the virtual network function descriptor (VNFD) specified by the European Telecommunications Standards Institute (ETSI) in the specification "Network Functions Virtualisation (NFV) Release 2; Protocols and Data Models; NFV descriptors based on TOSCA specification," version 2.5.1, published in December 2018. In some such examples, the VIFD 158 is a file that uses the Topology and Orchestration Specification for Cloud Applications (TOSCA) language to specify the instantiation parameters, operational behaviors, network communication requirements, etc., for the new workload 140. For example, a VNFD uses the TOSCA language to specify the instantiation parameters and operational behaviors of VNF workloads. For example, the VNFD can contain key performance indicators (KPIs) and/or other requirements that can be used in the process of onboarding and managing the lifecycle of the VNF workloads. However, a VNFD does not describe the real-time networking requirements for a workload, such as packet communication jitter targets/bounds, latency targets/bounds, etc. The VIFD 158 extends the VNFD to include network communication scheduling requirements for the workload 140, such as frame spacing, mean latency, an upper bound for latency, etc.

An example implementation of the VIFD 158 is illustrated in FIG. 6. The example VIFD 158 of FIG. 6 includes an example topology definition section 605, which specifies the instantiation parameters and operational behaviors of the workload 140. The example VIFD 158 of FIG. 6 also includes an example scheduling constraints definition section 610, which specifies the network communication scheduling requirements for the workload 140.

Returning to FIG. 1, in the illustrated example, the orchestrator 150 and the central user configurator 152 read the VIFD 158 for the workload 140. The orchestrator 150 parses the VM-related fields of the VIFD 158 to define the resource requirements (e.g. number of virtual central processing units (CPUs), memory, storage, network interfaces, etc.) for the workload 140 to be deployed (e.g., in real-time) to the compute node 104 (e.g., which may be an edge compute node or cluster in an industrial computer premises system). For example, the orchestrator 150 parses the topology definition section 605 of the VIFD 158 to determine the parameters (e.g., VM flavor, number of network connections, image name, number of cores, core isolation, core pinning, memory/disk sizes, etc.) to be used by the orchestrator to create a VM configuration specification for the VM 142, which is to host the workload 140 on the compute node 104. The orchestrator 150 then creates the VM configuration specification for the VM 142 based on the parameters parsed from the VIFD 158, and sends (e.g., transmits) the VM configuration specification (e.g., via the network 148) to the compute node 104 to deploy the VM 142 and workload 140 to the compute node 104. Accordingly, the orchestrator 150 is an example of means for parsing a virtualized industrial function descriptor to determine a virtual machine configuration specification for a virtual machine to deploy on a compute node to implement a virtualized workload.

In the illustrated example, the central user configurator 152 parses the scheduling-related fields of the VIFD 158 to determine the network communication scheduling requirements for the workload 140. For example, the central user configurator 152 parses the scheduling constraints definition section 610 of the VIFD 158 to identify the network communication scheduling parameters specified for the workload 140, which will be used by the central network configurator 154 to create an updated TSN schedule to accommodate the workload 140 in the time sensitive network 116. In some examples, the central user configurator 152 is implemented to meet the functional requirements of a central user configurator in accordance with the IEEE 802.1Qcc Standard, published on Oct. 31, 2018. In some such examples, the central user configurator 152 is an architectural component of a TSN environment, and is responsible for the discovery of end stations, retrieving end station capabilities and user requirements, etc. In the illustrated example of FIG. 1, the central user configurator 152 is responsible for identifying the network communication scheduling parameters specified in the VIFD 158 for the workload 140, and for transposing the identified network communication scheduling parameters into a parameter set supported by the central network configurator 154. In some examples, the central user configurator 152 determines whether the network communication scheduling parameters identified in the VIFD 158 for the workload 140 are supported by the central network configurator 154. In some such examples, if an identified network communication scheduling parameter is not supported by the central network configurator 154, the central user configurator 152 replaces the unsupported parameter with a different parameter (e.g., a nearest approximation) supported by the central network configurator 154. In some examples, if an identified network communication scheduling parameter is not supported by the central network configurator 154, the central user configurator 152 discards the unsupported parameter (e.g., if a suitable substitute is not available). Accordingly, the central user configurator 152 is an example of means for parsing a virtualized industrial function descriptor corresponding to a virtualized workload to determine a set of parameters for an updated time sensitive networking schedule to be implemented by one or more softswitches. For example, the central user configurator 152 may provide an updated time sensitive networking schedule to one softswitch to address communication requirements among workloads on the compute node associated with that softswitch. In other examples, the central user configurator 152 may provide an updated time sensitive networking schedule to multiple softswitches to address communication requirements across the time sensitive network 116 among workloads on different compute nodes associated with the different softswitches.

In the illustrated example, the central network configurator 154 provides a centralized means for performing resource reservation, scheduling, configuration of the compute nodes 104, 118 and the time sensitive network 116, etc. In some examples, the central network configurator 154 communicates with the compute nodes 104, 118, and possibly other elements of the time sensitive network 116 (e.g., the bridge 120, etc.), via a remote management protocol, such as the network configuration protocol (NETCONF), RESTCONF, etc. In the illustrated examples, the central network configurator 154 includes the scheduler 156 to create an updated TSN schedule based on the set of scheduling parameters provided by the central user configurator 152 (e.g., after any replacing/discarding, as described above) to accommodate the new workload 140. For example, the scheduler 156 of the central network configurator 154 creates the updated TSN schedule that complies with IEEE 802.1Qbv Standard and is intended to meet the real-time, isochronous packet transmission requirements specified in the VIFD 158 for the workload 140. Accordingly, the central network configurator 154 is an example of means for determine an updated TSN schedule based on a set of parameters specified for a virtualized workload.

Figure 2:
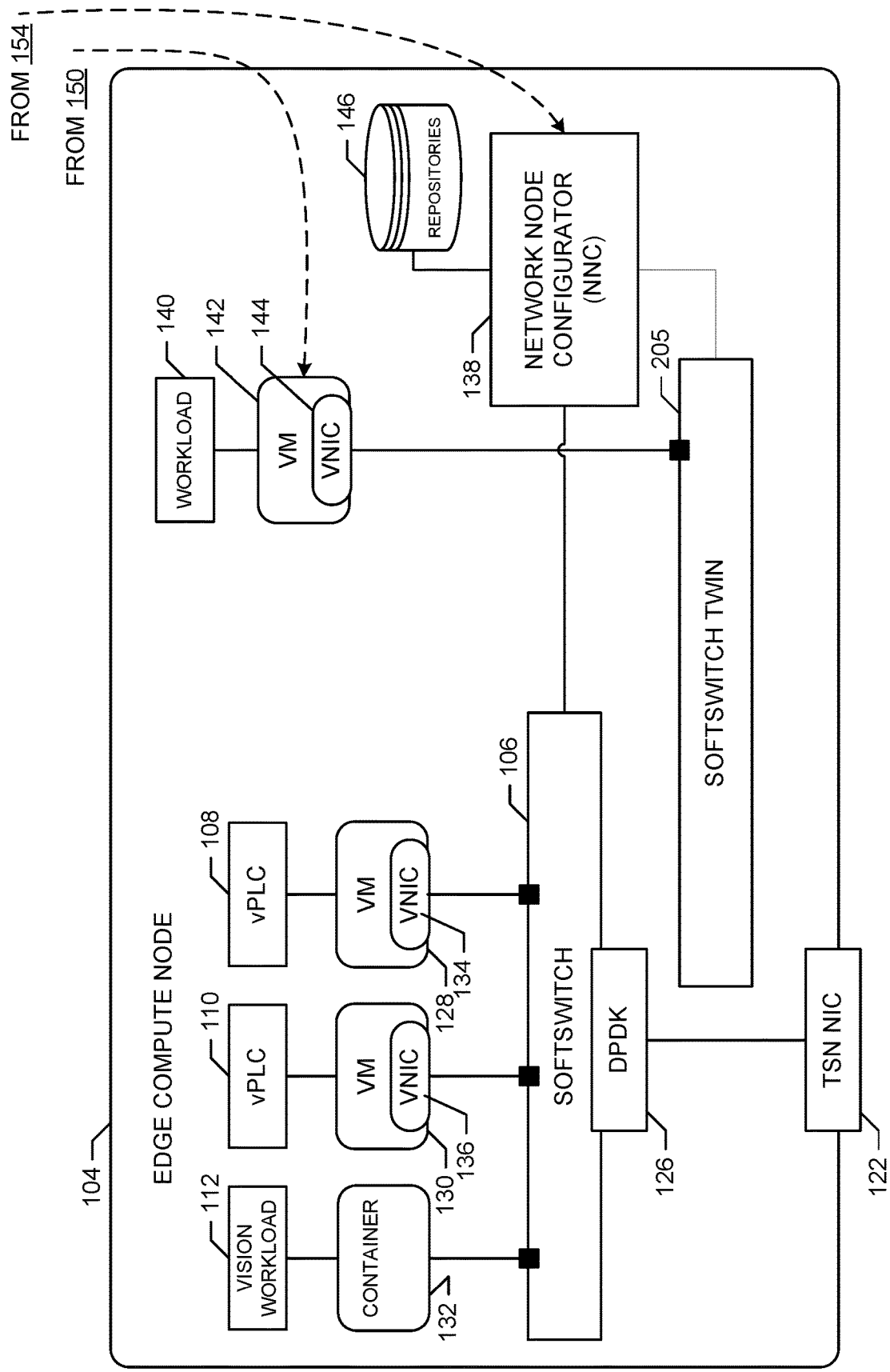
FIGS. 2-5 illustrate an example procedure performed by the example network node configurator of the example compute node of FIG. 1 to change the time sensitive networking schedule implemented by the softswitch of the compute node in accordance with teachings of this disclosure.

In the illustrated example, when the updated TSN schedule is ready, it is sent to the network node configurator 138 of the compute node 104 for deployment to the softswitch 106. For example, the updated TSN schedule may be sent via an end station configuration protocol, which may be based on a publish/subscribe mechanism, such as the OPC unified architecture (OPC-UA) protocol. Turning to FIG. 2, in response to receiving the updated TSN schedule, the network node configurator 138 creates (e.g., instantiates) an example duplicate softswitch 205, which is a duplicate or digital twin of the existing softswitch 205. The network node configurator 138 uses the duplicate softswitch 205 to test the updated TSN schedule and, upon successful validation, to apply the new TSN schedule at the compute node 104 without interruption of the existing workload 108, 110, 112 connected to the softswitch 106. Accordingly, the network node configurator 138 is an example of means for replacing a first softswitch implementing a first (e.g., existing) TSN schedule at a compute node with a second softswitch to implement a second (e.g., updated) TSN schedule at the compute node, which can include deploying the second softswitch on the compute node with an initial configuration based on (e.g., matching) the configuration of the first softswitch, configuring the second softswitch to implement the second (e.g., updated) TSN schedule, and replacing the first softswitch with the second softswitch after validation of the second TSN schedule implemented by the second softswitch.

For example, in response to receiving the updated TSN schedule, the network node configurator 138 accesses a configuration specification for the softswitch 106 from a softswitch specification repository included in the repositories 146 and/or downloaded from the central configuration controller 102. The configuration specification for the softswitch 106 may specify the configuration(s) of the VNF(s) and VM(s) implementing the softswitch 106, and/or any other configuration settings/data that define the implementation of the softswitch 106. In some examples, the network node configurator 138 also accesses any real-time metrics, status, etc., from the softswitch 106. The network node configurator 138 uses the accessed configuration specification for the softswitch 106, and any other metrics, status, etc., to create/instantiate the duplicate softswitch 205 on the compute node 104 such that the duplicate softswitch 205 is a digital copy (or digital twin) of the softswitch 106.

In some examples, the network node configurator 138 uses the configuration specification for the softswitch 106 to create/instantiate the duplicate softswitch 205 on the compute node 104 such that the duplicate softswitch 205 is an exact duplicate (e.g., a digital twin) of the softswitch 106. In other examples, the network node configurator 138 uses the configuration specification for the softswitch 106 to create/instantiate the duplicate softswitch 205 on the compute node 104 such that the duplicate softswitch 205 is substantially similar to the softswitch 106, except for some inconsequential differences in the configuration parameters. For example, the configuration specification for the softswitch 106 may specify configuration parameters defining the composition of the softswitch 106, such as a number of processing cores, an amount of memory, total number of data buffers (e.g., queues) for transmitting and receiving data packets, distribution of the data buffers (e.g., queues) across different data traffic classes (e.g., in terms of the number of data buffers assigned to each different data class), number of port connections assignable to VMs, etc. In examples in which the duplicate softswitch 205 is an exact duplicate (e.g., a digital twin) of the softswitch 106, the network node configurator 138 may create/instantiate the duplicate softswitch 205 such that its configuration specification includes all of the same configuration parameters as the configuration specification of the softswitch 106. In examples in which the duplicate softswitch 205 is a substantially similar copy of the softswitch 106, the network node configurator 138 may create/instantiate the duplicate softswitch 205 such that its configuration specification includes some of the same configuration parameters as the configuration specification of the softswitch 106 (e.g., such as the same number of processing cores, the same total number of data buffers (e.g., queues) for transmitting and receiving data packets, the same distribution of the data buffers (e.g., queues) across different data traffic classes, etc.), but other configuration parameters may differ (e.g., amount of memory, number of port connections assignable to VMs, etc.) if the parameters that differ will result in little to no change in operational performance between the softswitch 106 and the initially deployed duplicate softswitch 205.

In the illustrated example of FIG. 2, the network node configurator 138 also connects the VNIC 144 of the VM 142, which has been deployed to the compute node 104 to implement the virtualized workload 140, to the duplicate softswitch 205. For example, the network node configurator 138 may access a VM configuration file for the VM 142 from a VM configuration repository included in the repositories 146, access a configuration specification for the duplicate softswitch 205 (which initially corresponds/matches the configuration specification for softswitch 106) from the softswitch specification repository included in the repositories 146, and update the configuration files to map a port of VNIC 144 of the VM 142 to a port of the softswitch 205. In the illustrated example, the network node configurator 138 also configures the workload 140 hosted by the VM 142 to operate in a test mode (e.g., by setting an appropriate configuration setting, value, field, etc.).

Figure 3:
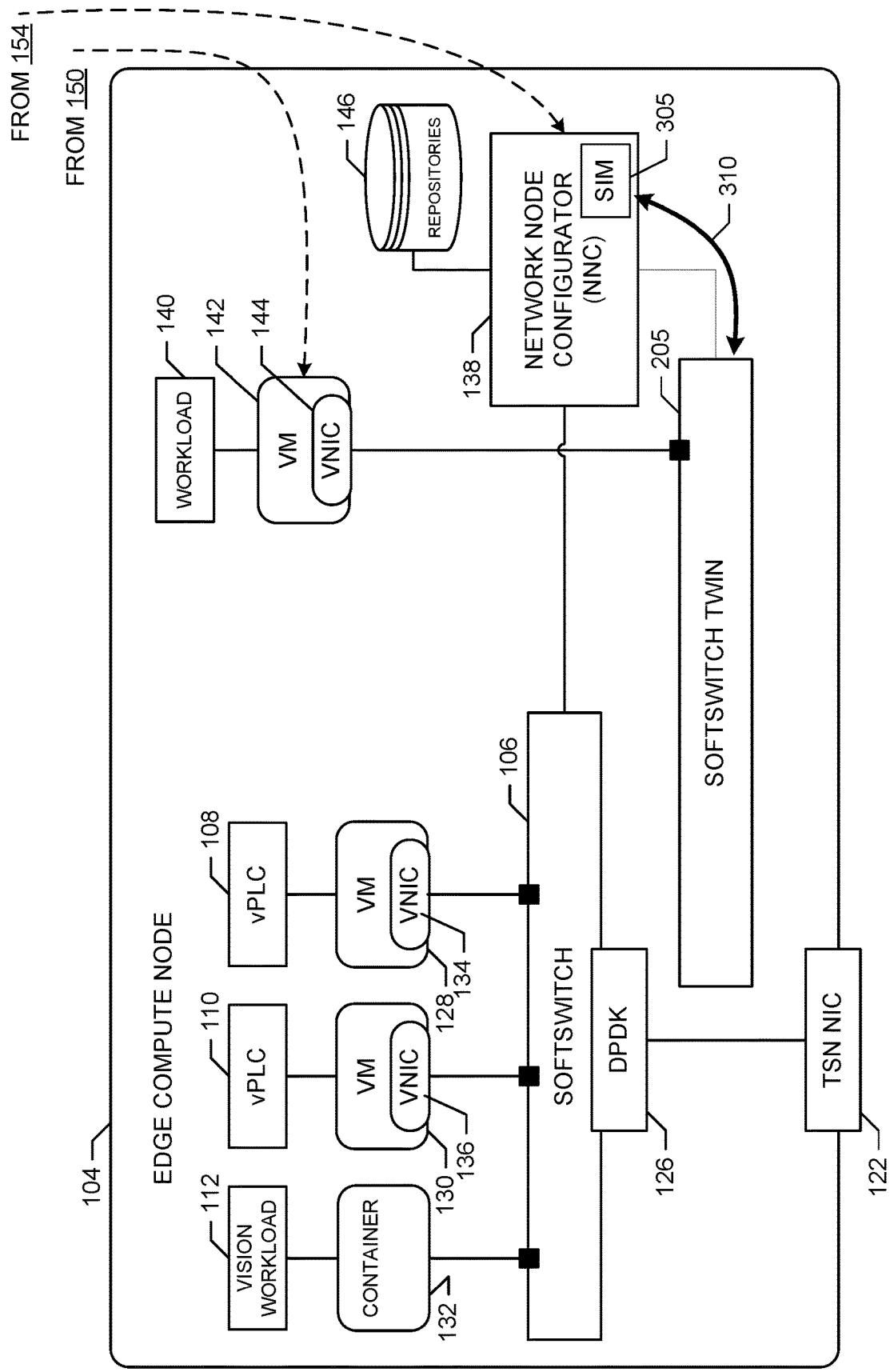

Turning to FIG. 3, after the duplicate softswitch 205 is instantiated on the compute node 104 and connected to the VM 142, which is hosting the workload 140 operating in test mode, the network node configurator 138 deploys the updated TSN schedule to the softswitch 205 and tests the updated TSN schedule using simulated network traffic. For example, the network node configurator 138 includes an example traffic simulator 305, which implements an on-node simulation engine on the compute node 104 that generates simulated network traffic to validate the updated TSN schedule implemented by the duplicate softswitch 205 before the validated updated TSN schedule is deployed for operation. Although the traffic simulator 305 is illustrated as being implemented by the network node configurator 138 in the illustrated example, in other examples, the traffic simulator 305 could be a separate element implemented on the compute node 104. Accordingly, the traffic simulator 305 is an example means for applying simulated network traffic to a softswitch.

In some examples, the traffic simulator 305 generates the simulated network traffic from actual network traffic monitored by the traffic simulator 305 during operation of the softswitch 106. For example, the traffic simulator 305 can monitor the actual network traffic communicated to/from the elements connected to the softswitch 106, such as the VMs 128/130 and the container 132, during operation of the workloads 108, 110, 112. In some examples, the traffic simulator 305 stores the monitored network traffic in a simulated network traffic repository included in the repositories 146. For example, the traffic simulator 305 can store the monitored network traffic as one or more packet-capture (PCAP) files in the simulated network traffic repository included in the repositories 146. In some examples, the traffic simulator 305 also obtains a test traffic file, such as a test traffic PCAP file, associated with new workload 140 being deployed to the compute node 104. For example, the orchestrator 150 may transmit a test traffic file to the compute node 104 (e.g., to the network node configurator 138 and/or the traffic simulator 305) with the VM configuration specification for the VM 142 implementing the new workload 140, which is stored in the simulated network traffic repository included in the repositories 146. The test traffic file in such examples may be generated to mimic the network traffic to be transmitted to and/or received from the type of physical equipment expected to be in communication with the workload 140. Additionally or alternatively, in some examples, the simulated network traffic repository included in the repositories 146 may store a library of different test traffic files for different types of workloads, and the traffic simulator 305 may select a network traffic file for the workload 140 from the repository based on the type of the workload 140.

In the illustrated example, the traffic simulator 305 generates the simulated network traffic to validate the updated TSN schedule by combining the previously monitored network traffic, which is associated with prior operation of the softswitch 106, with the test traffic file associated with the new workload 140. The traffic simulator 305 then applies the simulated network traffic to the duplicate softswitch 205 by simulating appropriate virtual sources and sinks to send and receive the simulated network traffic processed by the duplicate softswitch 205. In the illustrated example, the traffic simulator 305 also implements a virtual sink to receive network traffic sent by the workload 140 (and VM 142), which is operating in test mode, to process simulated network traffic received by the VM 142 and workload 140 (e.g., based on the test traffic file). The network node configurator 138 then monitors traffic performance metrics associated with the simulated network traffic processed by the duplicate softswitch 205 based on the updated TSN schedule. For example, one or more virtual network sinks implemented by the traffic simulator 305 may be configured to receive the simulated network traffic traversing the duplicate softswitch 205 and generate traffic performance metrics (e.g., such as packet jitter, packet latency, etc.) from the simulated network traffic before discarding the simulated network packets. For example, the virtual sinks(s) may generate the traffic performance metrics for the simulated network traffic associated with (e.g., receive and/or transmitted) by the workload 140 (also referred to as the simulated traffic performance metrics for the workload 140). Additionally or alternatively, in some examples, the virtual sinks(s) may generate the traffic performance metrics for the respective simulated network traffic associated with (e.g., previously monitored for) one, or more, or all of the other workloads 108, 110, 112 (also referred to as the simulated traffic performance metrics for the workloads 108, 110, 112). Additionally or alternatively, in some examples, the network node configurator 138 and/or traffic simulator 305 monitor switch metrics associated with operation of the duplicate softswitch 205 to process the simulated network traffic (e.g., such as buffer/queue utilization and/or overflow for different traffic classes specified by the updated TSN schedule, detected violations of the gate structure specified by the updated TSN schedule, etc.). The application of simulated network traffic to the duplicate softswitch 205, and the corresponding monitoring of the performance metrics, is represented by the directed line 310 in the example of FIG. 3.

In the illustrated example, the network node configurator 138 monitors the traffic performance metrics and switch metrics, if available, associated with the simulated network traffic processed on the duplicate softswitch 205 based on the updated TSN schedule and compares the monitored performance metrics to one or more sets of constraints to validate the updated TSN schedule. For example, the constraints may correspond to one or more of the network communication scheduling requirements specified in the VIFD 158 for the new workload 140 being deployed to the compute node 104. In some such examples, the central user configurator 152 and/or the central network configurator 154 provide (e.g., with the deployment of the updated TSN schedule to the compute node 104) one or more sets of network performance constraints for the new workload 140, which are parsed from the VIFD 158, to the network node configurator 138. The network node configurator 138 can then store the one or more sets of network performance constraints for the workload 140 in a workload scheduling and metrics specification repository included in the repositories 146. Likewise, the workload scheduling and metrics specification repository included in the repositories 146 may contain stored sets of network performance constraints previously received from the central user configurator 152 and/or the central network configurator 154 for the other workloads 108, 110 and 112. Examples of such network performance constraints include a frame spacing target, mean packet latency target, and upper packet latency bound, etc. The workload scheduling and metrics specification repository included in the repositories 146 may also include targets for the switch metrics monitored by the network node configurator 138.

In some examples, the network performance constraints obtained for the workload 140 (and previously for the other workloads 108, 110, 112) are identified to indicate the importance, or severity, of the constraint. For example, a constraint may be identified as a first type of constraint corresponding to a hard constraint that must be met by the monitored traffic metrics in order for the associated workload for the updated TSN schedule to be considered valid, or as a second type of constraint corresponding to a soft constraint that is desired to be met but not required in order for the updated TSN schedule to be considered valid. In some such examples, the network node configurator 138 groups the network performance constraints to be evaluated into a first set of constraints including the identified first type of constraints (e.g., hard constraints) and a second set of constraints including the identified second type of constraints (e.g., soft constraints). In some such examples, if the simulated network traffic has monitored traffic metrics that meet the first set of constraints (e.g., hard constraints), the network node configurator 138 may spend an amount of time up to a bounded time limit to adjust the configuration of the duplicate softswitch 205 to meet one or more of the constraints included in the second set of constraints (e.g., the soft constraints). In some examples, the bounded time limit, also referred to as an optimization time limit, is specified in the VIFD 158 for the new workload 140 being deployed to the compute node 104, and is provided to the network node configurator 138 by the central user configurator 152 and/or the central network configurator 154 with the other constraints. In some such examples, the optimization time limit may be related to an amount of delay that can be tolerated while the workload 140 is being deployed to the compute node 104.

In the illustrated example, the network node configurator 138 compares the simulated traffic performance metrics for workload 140 and, in some examples, the simulated traffic performance metrics for the other workloads 108, 110, 112 processed by the duplicate softswitch 205, with the respective sets of constraints for the corresponding workloads to determine whether the updated TSN schedule implemented by the duplicate softswitch 205 is valid. In some examples, the network node configurator 138 may also compare the switch metrics determined for the duplicate softswitch 205 when processing the simulated network traffic to corresponding targets to determine whether the updated TSN schedule implemented by the duplicate softswitch 205 is valid. In some examples in which the new workload 140 is associated with a first set of constraints corresponding to hard constraints and a second set of constraints corresponding to soft constraints, the network node configurator 138 determines the updated TSN schedule is valid if the simulated traffic performance metrics associated with the workload 140 satisfy the first set of constraints. In some such examples, if the existing workloads 108, 110, 112 are also associated with respective first sets of constraints corresponding to hard constraints and seconds set of constraints corresponding to soft constraints, the network node configurator 138 determines the updated TSN schedule is valid if the simulated traffic performance metrics associated with the respective workloads 108, 110, 112 also satisfy their corresponding first sets of constraints. For example, the first sets of constraints corresponding to hard constraints may be constraints that, if met, indicate that deterministic packet scheduling has been achieved with the updated TSN schedule and that threshold network performance targets for the corresponding workloads are met.

In some examples, after the network node configurator 138 determines the updated TSN schedule is valid because the first sets of constraints corresponding to hard constraints are met, the network node configurator 138 then determines whether the second set of constraints corresponding to soft constraints for the workload 140. In some examples, the network node configurator 138 also determines whether the respective second sets of constraints corresponding to soft constraints for the workloads 108, 110, 112 have also been met. If one or more of the soft constraints in the second set of constraints have not been met, the network node configurator 138 adjusts the configuration of the duplicate softswitch 205 to enable one or more of the soft constraints to be met. For example, the duplicate softswitch 205 may include multiple data buffers (e.g., queues) assigned to different data classes defined by the TSN schedule, which the duplicate softswitch 205 gates on and off to allow traffic to packets in the buffers to traverse the softswitch 205 to meet timing requirements specified by the updated TSN schedule. To adjust the duplicate softswitch 205 such that one or more of the soft constraints can be met, the network node configurator 138 may adjust the number of data buffers (e.g., queues) assigned to the different data classes defined by the TSN schedule, adjust when and/or how often and/or for how long different ones of the data buffers (e.g., queues) are gated on to allow their respective packets to traverse the softswitch 205, etc. In some examples, the network node configurator 138 adjusts the duplicate softswitch 205 iteratively such that ones of the soft constraints are met in priority weighting order, with higher soft constraints being optimized before lower soft constraints, resulting in iterative optimization of the soft constraints. In some examples, the network node configurator 138 continues adjusting the configuration of the duplicate softswitch 205 iteratively until all soft constraints are met or until the bounded time limit for adjusting the configuration of the duplicate softswitch 205 is reached. At this point, the updated TSN schedule and configuration of the duplicate softswitch 205 are finalized and ready to be deployed on the compute node 104

Figure 4:
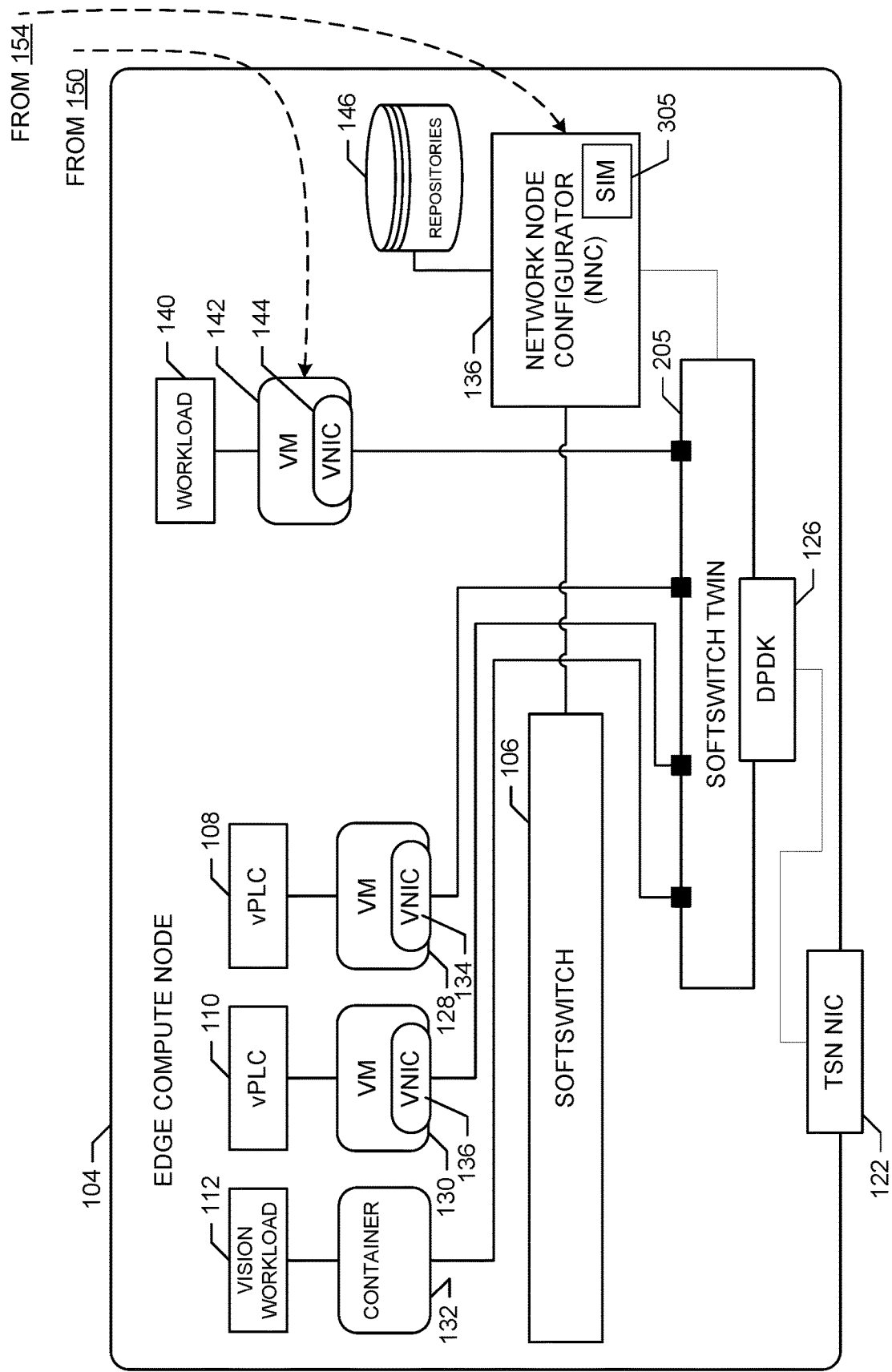

Turning to FIG. 4, if the network node configurator 138 determines the updated TSN schedule is not valid (e.g., because one or more of the first set of constraints corresponding to hard constraints, such as a frame delivery deadline, are not met by the updated TSN schedule), the network node configurator 138 generates a failure message and sends the failure message to the central configuration controller 102 for receipt by the central user configurator 152 and the orchestrator 150. In response to the failure message, the orchestrator 150 causes the new virtualized workload 140 instance to be deleted from the compute node 104 (e.g., by deleting its VM 142). The network node configurator 138 also deletes the updated TSN schedule and the duplicate softswitch 205 from the compute node 104.

However, if the network node configurator 138 determines the updated TSN schedule is valid (e.g., because the first set of constraints corresponding to hard constraints, such as a frame delivery deadline, are met by the updated TSN schedule), the network node configurator 138 generates a success message and sends the success message to the central configuration controller 102 for receipt by the central user configurator 152 and the orchestrator 150. The network node configurator 138 is also responsible for replacing the existing softswitch 106 with the new softswitch 205 and transitioning the new workload 140 and the existing workloads 108, 110 and 112 to the new softswitch 205.

For example, as shown in the example of FIG. 4, the network node configurator 138 connects the newly configured softswitch 205 implementing the updated TSN schedule to the NIC 122 of the compute node via the DPDK 126 (e.g., by updating the configuration specifications of the respective softswitches 106 and 205). The network node configurator 138 also adds new port connections to the respective VMs/containers 128, 130, 132 implementing the corresponding existing workloads 108, 110, 112, binds the new ports to the new softswitch 205, and deletes the previous port bindings associated with the softswitch 106, as shown (e.g., by updating the configuration files for the VMs/containers 128, 130, 132 and the softswitches 106 and 205). The network node configurator 138 also configures the new workload 140 hosted by the VM 142 to operate in an operational mode instead of test mode (e.g., by setting an appropriate configuration setting, value, field, etc.). The network node configurator 138 also stores the configuration specification for the new softswitch 205 in the softswitch specification repository included in the repositories 146 and/or reports the configuration specification for the new softswitch 205 to the central configuration controller 102.

Figure 5:
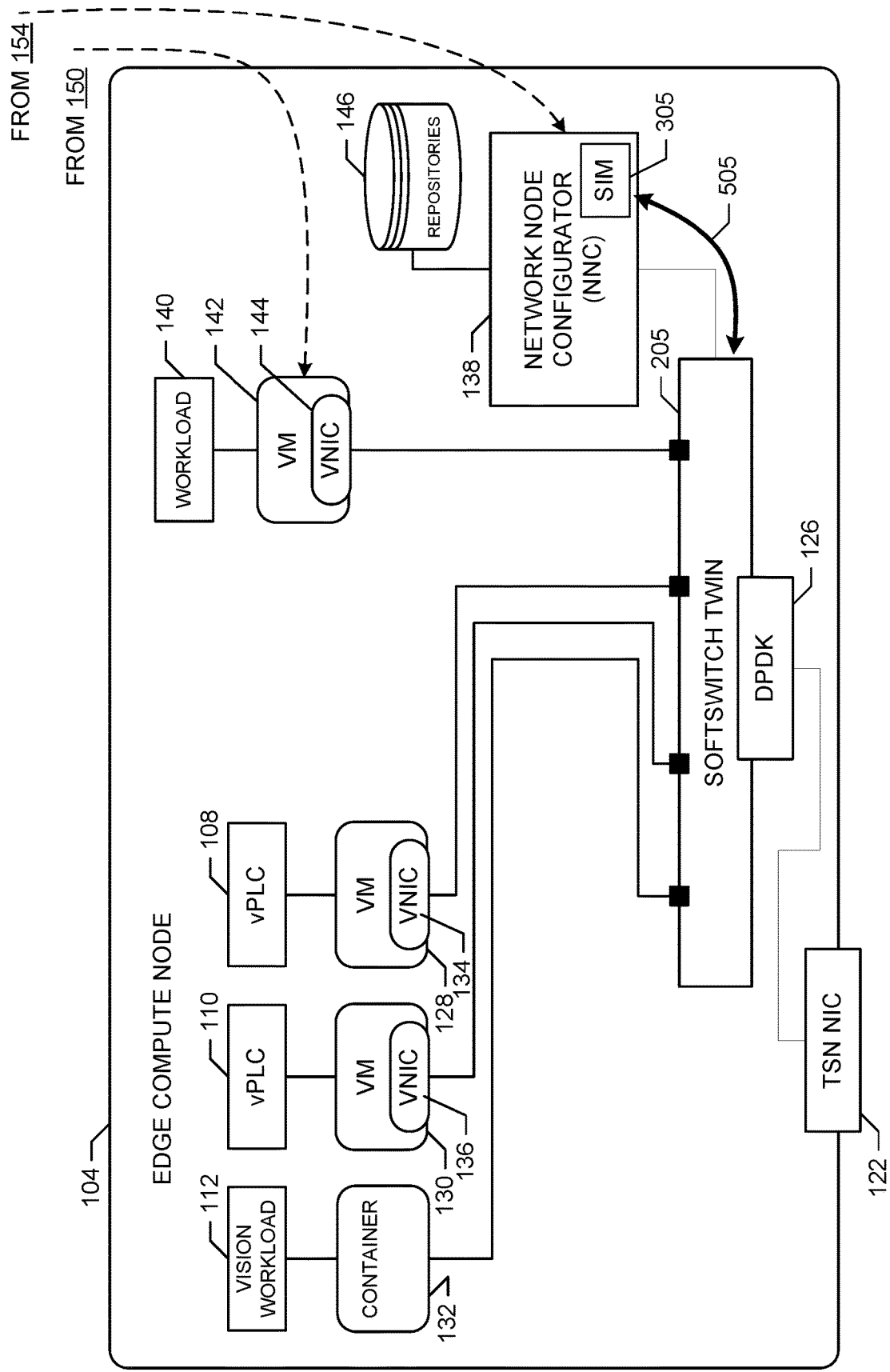

Next, turning to FIG. 5, the network node configurator 138 deletes the old softswitch 106 from the compute node 104 and deletes its configuration specification from the softswitch specification repository included in the repositories 146. In this manner, the network node configurator 138 replaces the old softswitch 106 implementing the old TSN schedule with the new softswitch 205 implementing the updated TSN schedule. Because the switchover is performed after the updated TSN schedule implemented by the new softswitch 205 is verified with the simulated network traffic, and can be accomplished quickly by updating configuration specification files for the VMs/containers 128, 130, 132 and softswitches 106, 205, the existing workloads 108, 110 and 112 can experience negligible downtime during the switchover. In the illustrated example, after the switchover from the old softswitch 106 implementing the old TSN schedule to the new softswitch 205 implementing the updated TSN schedule, the traffic simulator 305 monitors the network traffic traversing the new softswitch 205 (e.g., which is associated with the workloads 108, 110, 112 and 140) and stores the monitored network traffic (e.g., as one or more PCAP files) in the simulated network traffic repository included in the repositories 146. This monitored network traffic stored in the simulated network traffic repository included in the repositories 146 can later be used, as described above, when another updated TSN schedule is to be deployed to the compute node 104.

Figures 7, 11:
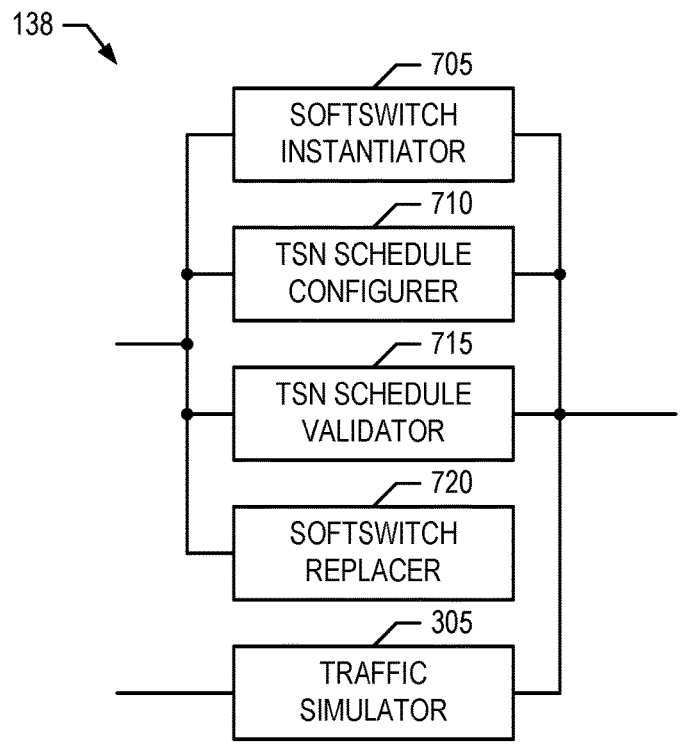
FIG. 7 is a block diagram of an example implementation of the network node configurator of FIGS. 1-5.
FIGS. 9-12 are flowcharts and pseudocode representative of example computer readable instructions that may be executed to implement the example network node configurator of FIGS. 1-5 and/or 7.

A block diagram of an example implementation of the network node configurator 138 of FIGS. 1-5 is illustrated in FIG. 7. The example network node configurator 138 of FIG. 7 includes an example softswitch instantiator 705 to instantiate the duplicate softswitch 205 on the compute node 104 in response to receiving the updated TSN schedule, as described above. The network node configurator 138 of FIG. 7 includes an example TSN schedule configure 710 to configure the duplicate softswitch 205 to implement the updated TSN schedule, as described above. The network node configurator 138 of FIG. 7 includes the example traffic simulator 305 and an example TSN schedule validator 715 to validate the updated TSN schedule implemented by the duplicate softswitch 205, as described above. The network node configurator 138 of FIG. 7 includes an example softswitch replacer 720 to replace the existing softswitch 106 with the new softswitch 205 on the compute node 104 in response to successful validation of the updated TSN schedule, as described above.

While example manners of implementing the example central configuration controller 102 and the example network node configurator 138 are illustrated in FIGS. 1-7, one or more of the elements, processes and/or devices illustrated in FIGS. 1-7 may be combined, divided, re-arranged, omitted, eliminated and/or implemented in any other way. Further, the example orchestrator 150, the example central user configurator 152, the example central network configurator 154, the example scheduler 156, the example traffic simulator 305, the example softswitch instantiator 705, the example TSN schedule configure 710, the example TSN schedule validator 715, the example softswitch replacer 720 and/or, more generally, the example central configuration controller 102 and the example network node configurator 138 of FIGS. 1-7 may be implemented by hardware, software, firmware and/or any combination of hardware, software and/or firmware. Thus, for example, any of the example orchestrator 150, the example central user configurator 152, the example central network configurator 154, the example scheduler 156, the example traffic simulator 305, the example softswitch instantiator 705, the example TSN schedule configure 710, the example TSN schedule validator 715, the example softswitch replacer 720 and/or, more generally, the example central configuration controller 102 and the example network node configurator 138 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), field programmable gate arrays (FPGAs) and/or field programmable logic device(s) (FPLD(s)). When reading any of the apparatus or system claims of this patent to cover a purely software and/or firmware implementation, at least one of the example central configuration controller 102, the example network node configurator 138, the example orchestrator 150, the example central user configurator 152, the example central network configurator 154, the example scheduler 156, the example traffic simulator 305, the example softswitch instantiator 705, the example TSN schedule configure 710, the example TSN schedule validator 715 and/or the example softswitch replacer 720 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central configuration controller 102 and/or the example network node configurator 138 of FIGS. 1-7 may include one or more elements, processes and/or devices in addition to, or instead of, those illustrated in FIGS. 1-7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts and pseudocode representative of example hardware logic, machine readable instructions, hardware implemented state machines, and/or any combination thereof for implementing the example central configuration controller 102 and the example network node configurator 138 are shown in FIGS. 8-14. In these examples, the machine readable instructions may be one or more executable programs or portion(s) of an executable program for execution by a computer processor, such as the processor 1512 and/or 1612 shown in the example processor platforms 1500 and 1600 discussed below in connection with FIGS. 15-16. The one or more programs, or portion(s) thereof, may be embodied in software stored on a non-transitory computer readable storage medium such as a CD-ROM, a floppy disk, a hard drive, a DVD, a Blu-ray Disk™, or a memory associated with the processors 1512 and/or 1612, but the entire program or programs and/or parts thereof could alternatively be executed by a device other than the processors 1512 and/or 1612, and/or embodied in firmware or dedicated hardware. Further, although the example program(s) is(are) described with reference to the flowcharts and pseudocode illustrated in FIGS. 8-14, many other methods of implementing the example central configuration controller 102 and/or the example network node configurator 138 may alternatively be used. For example, with reference to the flowcharts and pseudocode illustrated in FIGS. 8-14, the order of execution of the blocks may be changed, and/or some of the blocks described may be changed, eliminated, combined and/or subdivided into multiple blocks. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 8-14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. Also, as used herein, the terms "computer readable" and "machine readable" are considered equivalent unless indicated otherwise.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 8:
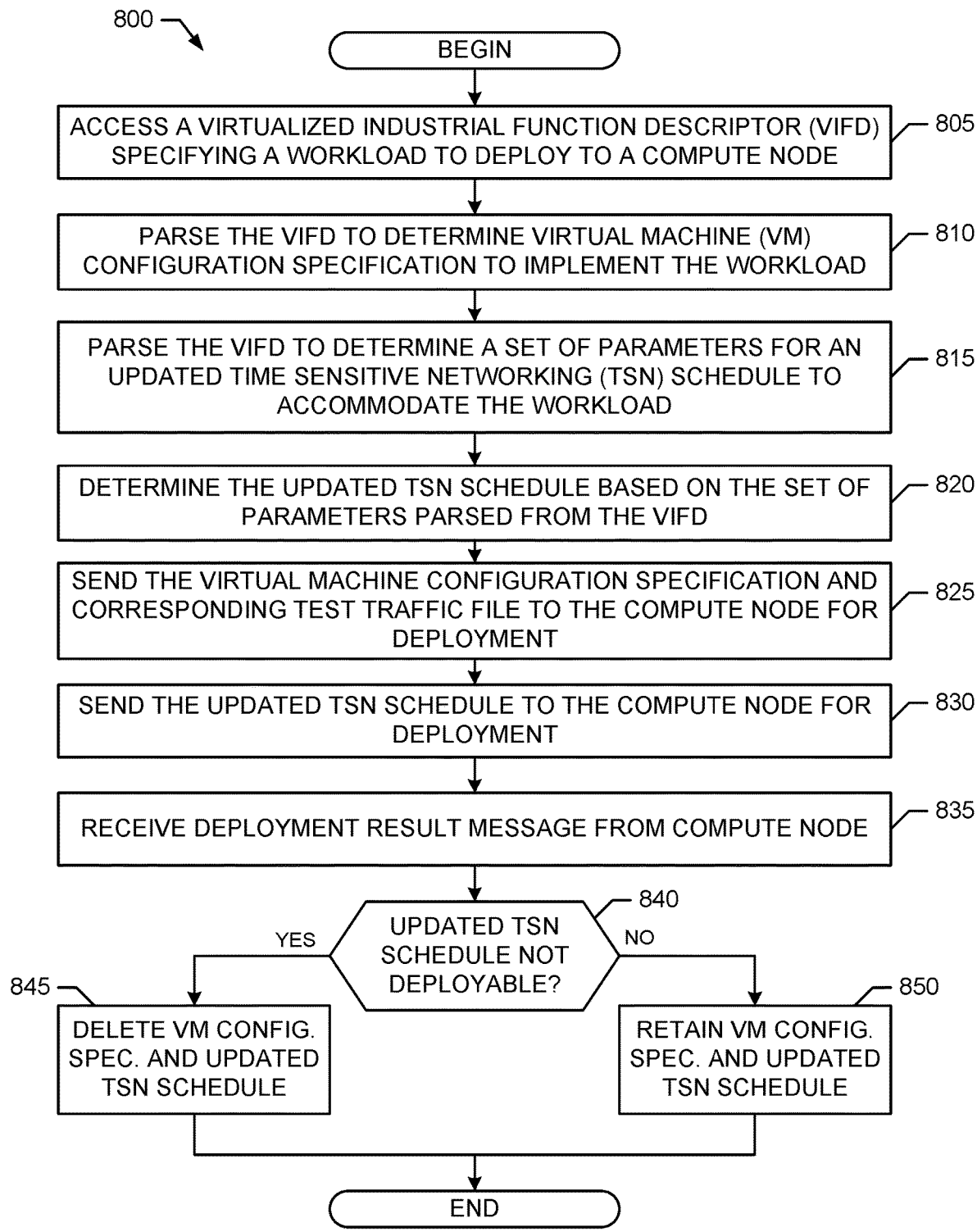
FIG. 8 is a flowchart representative of example computer readable instructions that may be executed to implement the example central configuration controller of FIG. 1.

An example program 800 that may be executed to implement the example central configuration controller 102 of FIG. 1 is represented by the flowchart shown in FIG. 8. With reference to the preceding figures and associated written descriptions, the example program 800 begins execution at block 805 at which the central configuration controller 102 accesses the VIFD 158 specifying the new workload 140 to deploy to the compute node 104. At block 810, the orchestrator 150 of the central configuration controller 102 parses the VIFD 158 to determine a VM configuration specification to implement the workload 140, as described above. At block 815, the central user configurator 152 of the central configuration controller 102 parses the VIFD to determine a set of parameters for an updated TSN schedule to accommodate the workload 140, as described above. At block 820, the central network configurator 154 of the central configuration controller 102 determines, as described above, the updated TSN schedule based on the set of parameters parsed from the VIFD 158 at block 815. At block 825, the orchestrator 150 sends the VM configuration specification and a corresponding test traffic file to the compute node 104 to deploy the workload 140 at the compute node 104, as described above. At block 830, the central network configurator 154 sends the updated TSN schedule to the compute node for deployment at the compute node 104, as described above.

At block 840, the central configuration controller 102 later receives a message, as described above, which indicates a deployment result for deploying the workload 140 and the updated TSN schedule at the compute node 104. If, at block 840, the central configuration controller 102 determines the message indicates the updated TSN schedule was not deployable (e.g., was found to be invalid), processing proceeds to block 845; otherwise processing proceeds to block 850. At block 845, the orchestrator 150 deletes the VM configuration specification for the workload 140 and the central network configurator 154 deletes the updated TSN schedule, as described above, which cancels the attempt to deploy the workload 140 and the updated TSN schedule to the compute node 104. At block 850, the orchestrator 150 retains the VM configuration specification for the workload 140 and the central network configurator 154 retains the updated TSN schedule, as described above, which tracks the successful deployment of the workload 140 and the updated TSN schedule to the compute node 104.

Figure 9:
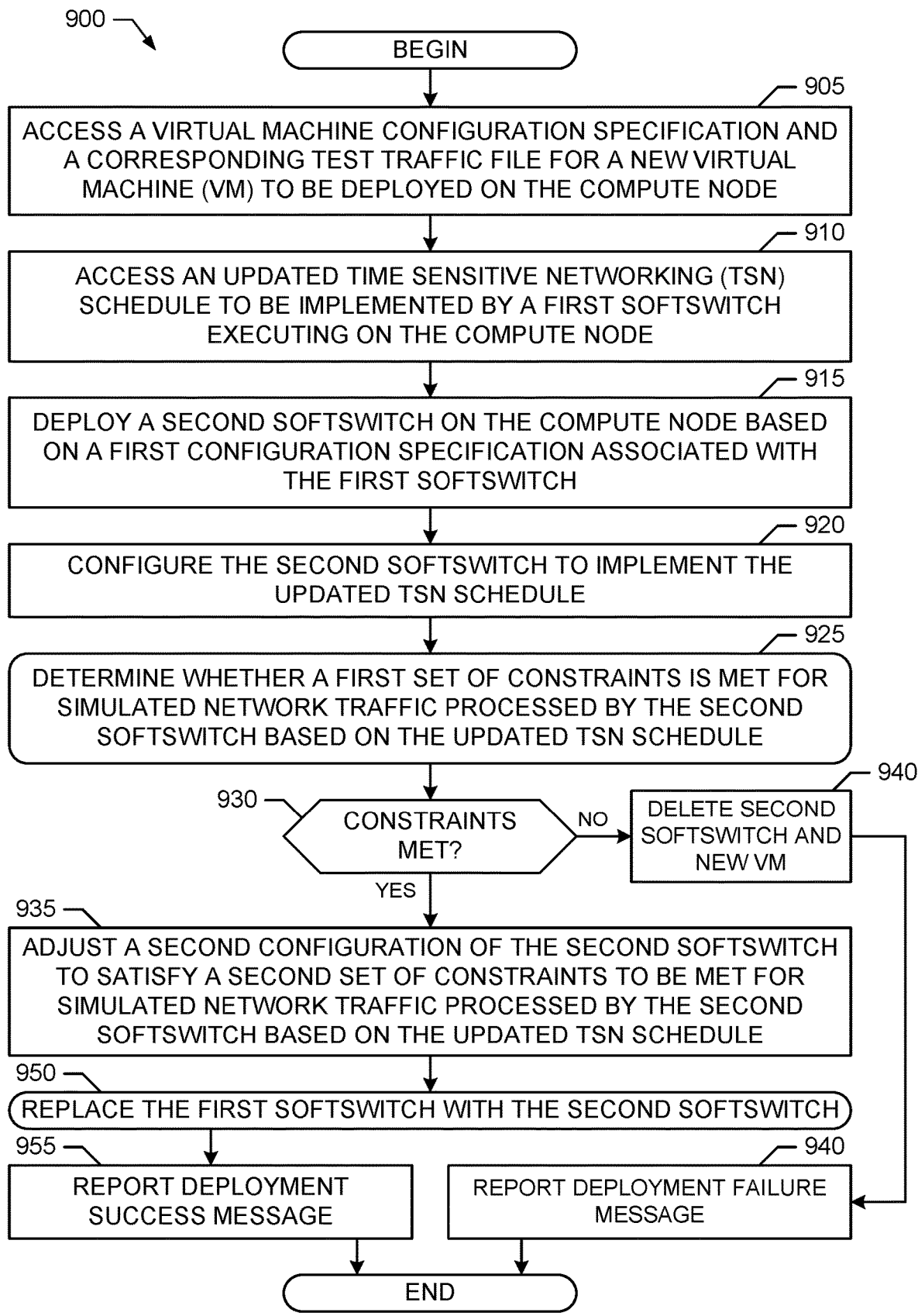

An example program 900 that may be executed to implement the example network node configurator 138 of FIGS. 1-5 and/or 7 is represented by the flowchart shown in FIG. 9. With reference to the preceding figures and associated written descriptions, the example program 900 begins execution at block 905 at which the network node configurator 138 accesses a VM configuration specification and associated test traffic file received from the central configuration controller 102 for the new workload 140 to be deployed at the compute node 104, as described above. At block 910, the network node configurator 138 accesses an updated TSN schedule received from the central configuration controller 102 for implementation by the softswitch 106 on the compute node 104, as described above. At block 915, the softswitch instantiator 705 of the network node configurator 138 deploys the duplicate softswitch 205 on the compute node 104 based on (e.g., to match) a first configuration of the softswitch 106 executing on the compute node 104, as described above. At block 920, the TSN schedule configure 710 of the network node configurator 138 configures the duplicate softswitch 205 to implement the updated TSN schedule, as described above. At block 925, the TSN schedule validator 715 of the network node configurator 138 determines whether a first set of constraints (e.g., hard constraints) is met for simulated network traffic processed by the duplicate softswitch 205 based on the updated TSN schedule, as described above. An example program 925P that may be executed to implement the processing at block 925 is illustrated in FIG. 10, which is described below.

If the first set of constraints (e.g., hard constraints) are met, processing proceeds to block 935; otherwise processing proceeds to block 940. At block 940, the network node configurator 138 determines the updated TSN schedule is invalid and, thus, deletes the duplicate softswitch 205 and the VM 142 that was deployed to implement the workload 140, as described above. At block 945, the network node configurator 138 reports a deployment failure status message to the central configuration controller 102, as described above.

Figure 12:
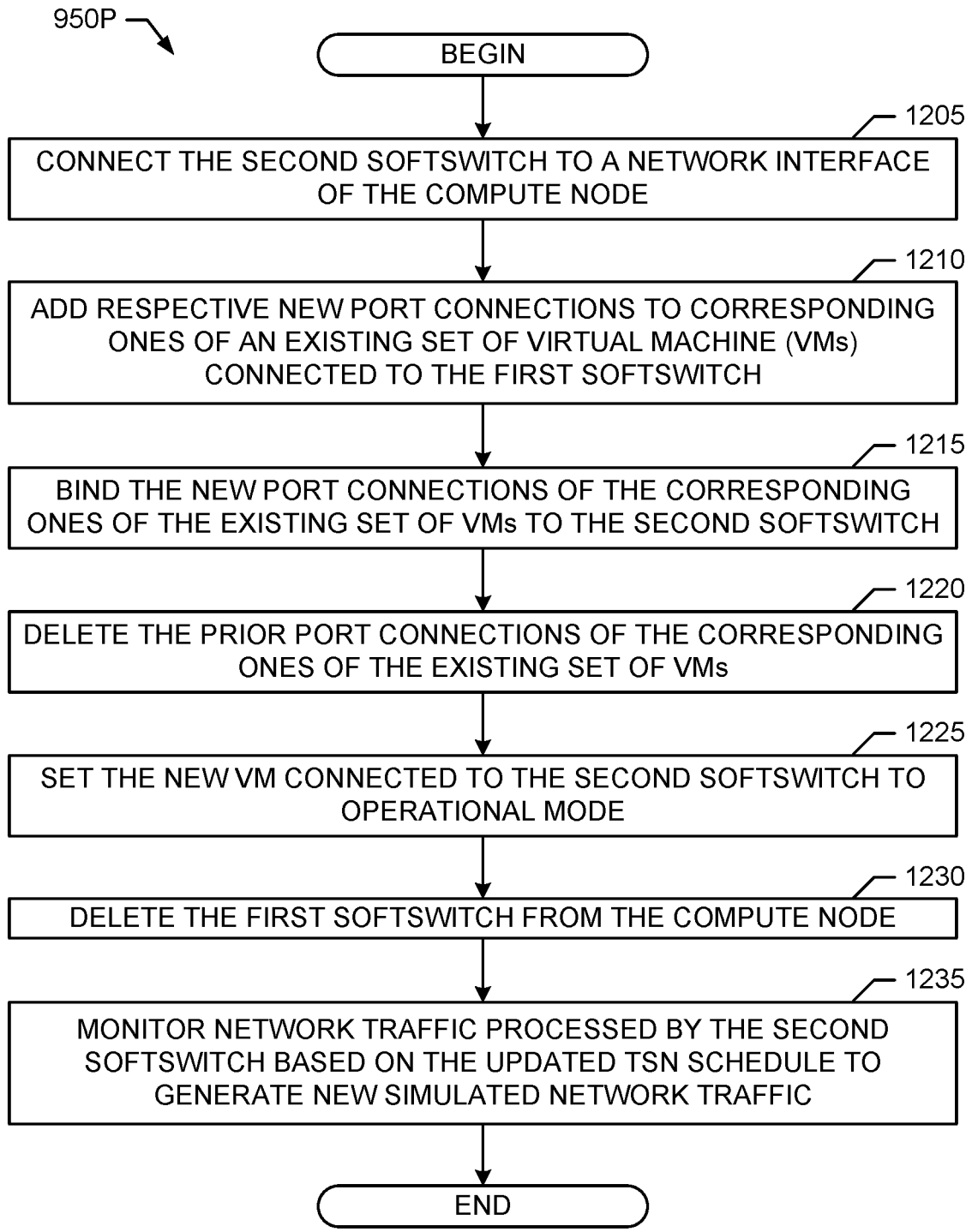

Conversely, at block 935, the network node configurator 138 determines the updated TSN schedule is valid and, thus, adjusts the second configuration associated with the duplicate softswitch 205 to satisfy one or more of a second set of constraints (e.g., soft constraints) to be met for the simulated network traffic processed by the duplicate softswitch 205 based on the updated TSN schedule, as described above. At block, the softswitch replacer 720 of the network node configurator 138 replaces the existing softswitch 106 with the new softswitch 205, as describe above. An example program 950P that may be executed to implement the processing at block 950 is illustrated in FIG. 12, which is described below. At block 955, the network node configurator 138 reports a deployment success status message to the central configuration controller 102, as described above.

Figure 10:
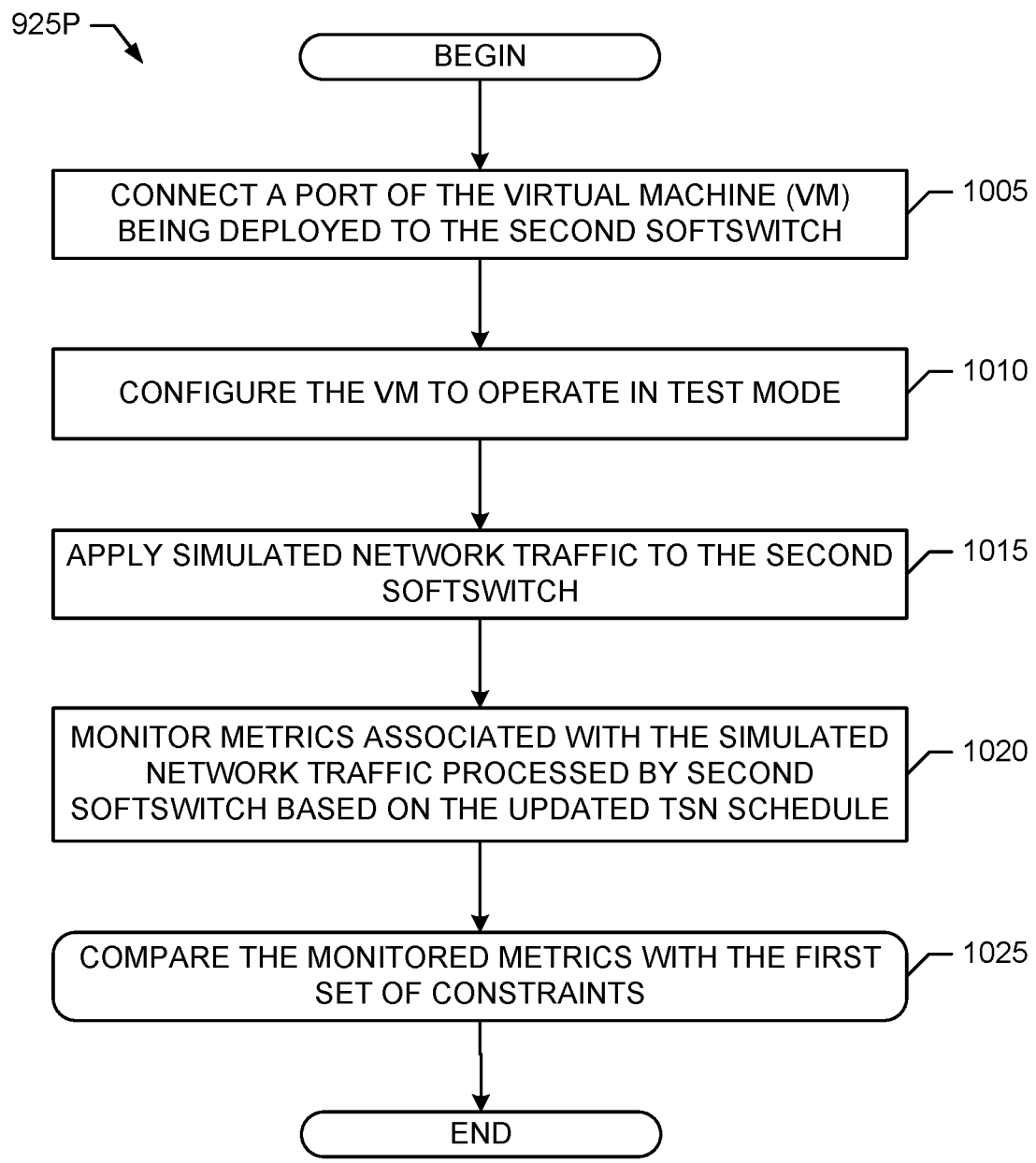

An example program 925P that may be executed to implement the processing at block 925 of FIG. 9 is illustrated in FIG. 10. With reference to the preceding figures and associated written descriptions, the example program 925P begins execution at block 1005 at which the example TSN schedule validator 715 of the network node configurator 138 connects a port of the VM 142, which is being deployed to implement the workload 140, to the duplicate softswitch 205, as described above. At block 1010, the TSN schedule validator 715 configures the workload 140 hosted by the VM 142 to operate in test mode, as described above. At block 1015, the TSN schedule validator 715 invokes the traffic simulator 305 to apply simulated network traffic to the duplicate softswitch 205, as described above. At block 1020, the TSN schedule validator 715 monitors metrics associated with the simulate network traffic processed by the softswitch 205 based on the updated TSN schedule, as described above. At block 1025, the TSN schedule validator 715 compares the monitored metrics to the first set of constraints (e.g., hard constraints), as described above. Example pseudocode 1025S that may be executed to implement the processing at block 1025 is illustrated in FIG. 11.

An example program 950P that may be executed to implement the processing at block 950 of FIG. 9 is illustrated in FIG. 12. With reference to the preceding figures and associated written descriptions, the example program 950P begins execution at block 1205 at which the softswitch replacer 720 of the network node configurator 138 connects the new softswitch 205 to the NIC 122 of the compute node 104, as described above. At block 1210, the softswitch replacer 720 adds respective new port connections to the corresponding existing VMs/containers 128, 130, 132 implemented the existing workloads 108, 110, 112 on the compute node 104, as described above. At block 1215, the softswitch replacer 720 binds the new port connections of the VMs/containers 128, 130, 132 to the new softswitch 205, as described above. At block 1220, the softswitch replacer 720 deletes the prior port connections of the VMs/containers 128, 130, 132 that connected to the softswitch 106, as described above. At block 1225, the softswitch replacer 720 sets the new workload 140 hosted by the new VM 142, which is already connected to the new softswitch 205, to operational mode, as described above. At block 1230, the softswitch replacer 720 deletes the softswitch 106 from the compute node 104, as described above. At block 1235, the softswitch replacer 720 invokes the traffic simulator 305 to monitor the network traffic processed by the new softswitch 205 based on the updated TSN schedule to generate new simulated network traffic to be used to validate future TSN schedule updates, as described above.

Figure 13:
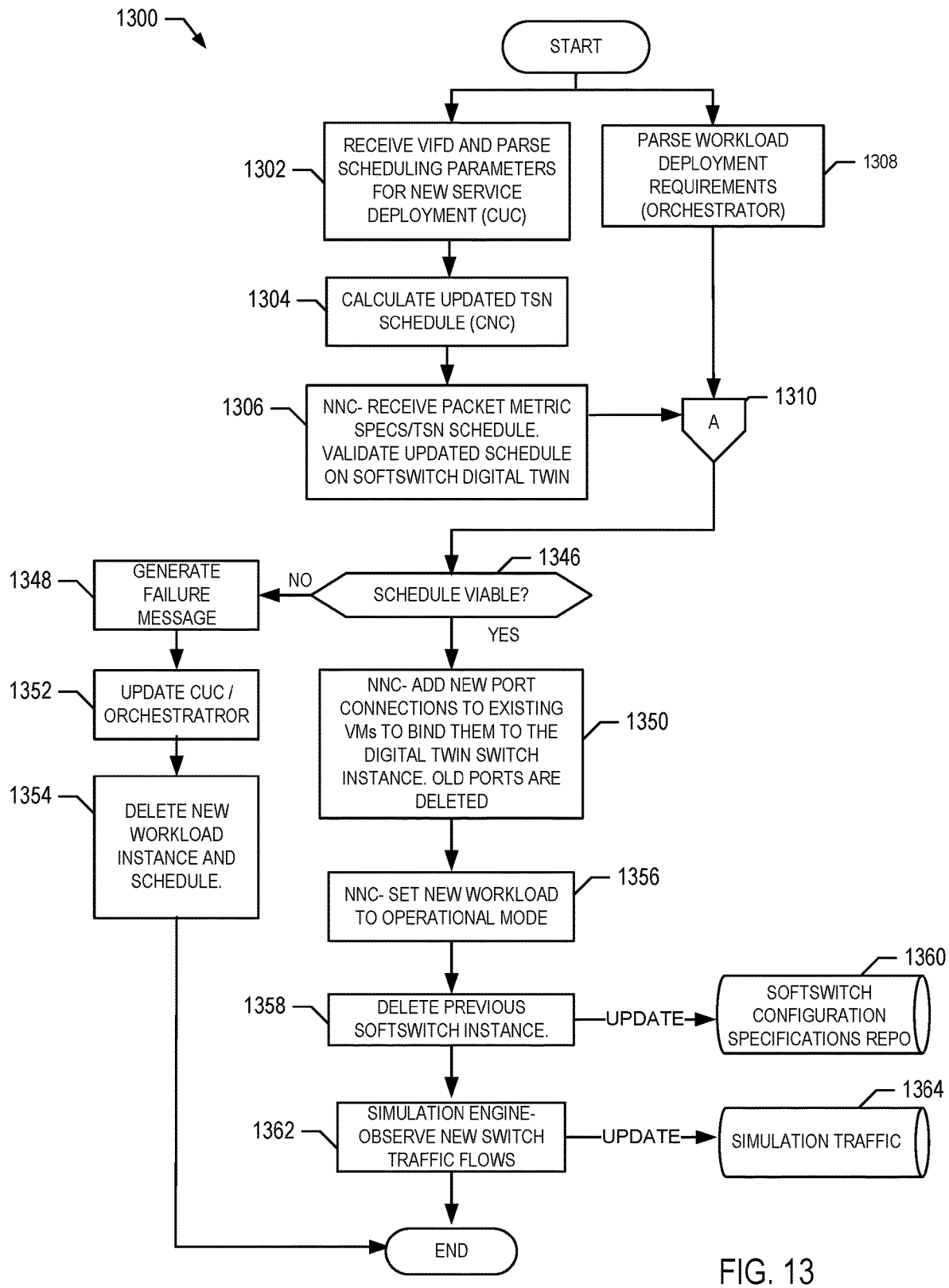
FIGS. 13-14 collectively illustrated a flowchart representative of example computer readable instructions that may be executed to implement the example central configuration controller of FIG. 1 and the example network node configurator of FIGS. 1-5 and/or 7.
Figure 14:
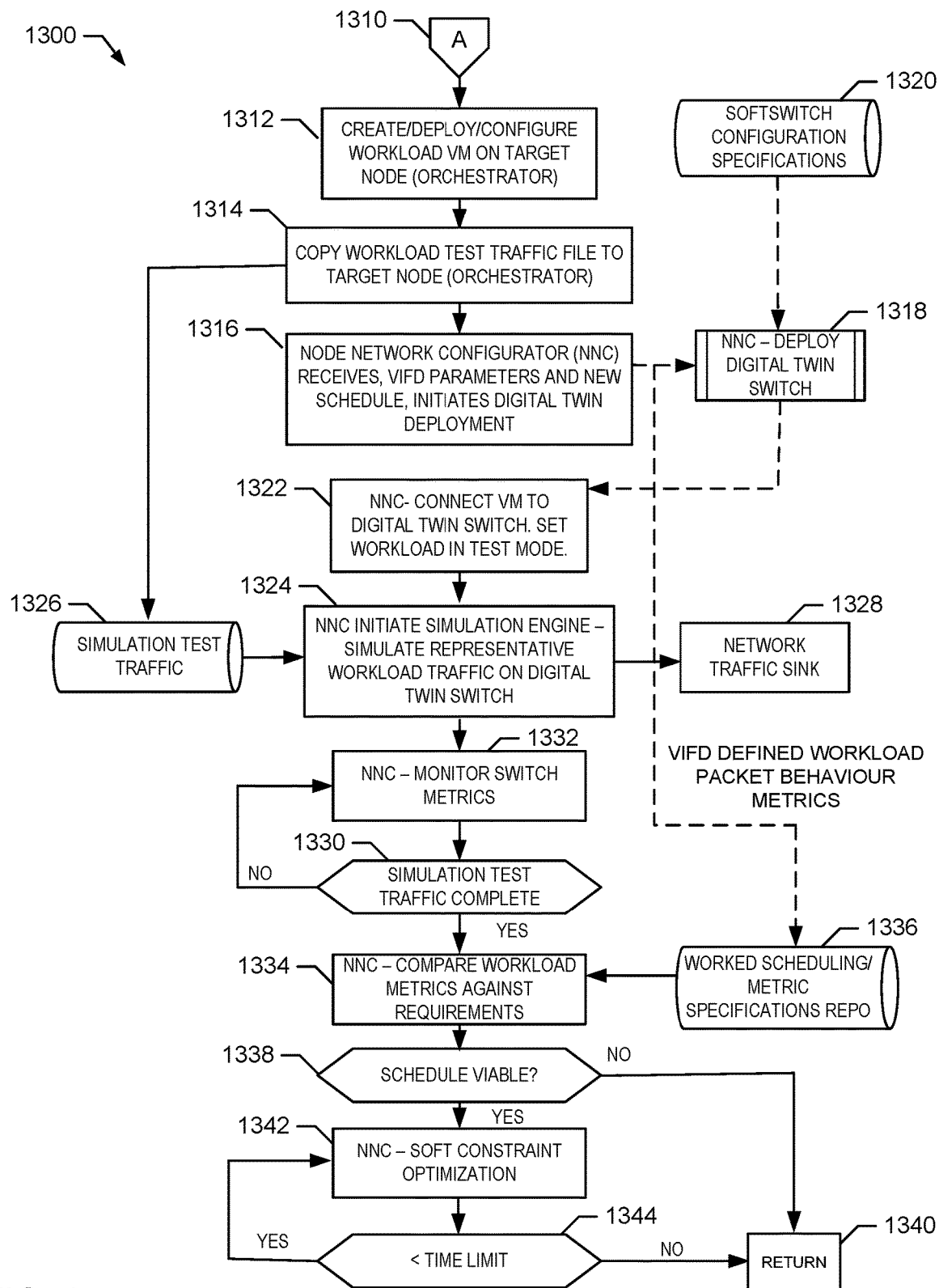

An example program 1300 that may be executed to implement the example central configuration controller 102 and the example network node configurator 138 is represented by the flowchart shown in FIGS. 13-14. With reference to the preceding figures and associated written descriptions, the example program 1300 begins execution at block 1302 at which the central user configurator 152 of the central configuration controller 102 accesses and parses the VIFD 158 for the workload 140 corresponding to a new service deployment to obtain the network scheduling requirements for the workload 140, as described above. At block 1304, the central network configurator 154 determines an updated TSN schedule based on the network scheduling requirements parsed from the VIFD 158, as described. At block 1306, the network node configurator 138 receives from the central network configurator 154 the updated TSN schedule and set(s) of constraints to be evaluated to validate the updated TSN schedule on the compute node 104, as described above. In parallel, at block 1308, the orchestrator 150 of the central configuration controller 102 parses the VIFD 158 for the workload 140 to determine the workload deployment requirements to be used to create the VM 142 (or container) to be deployed to implement the new workload 140, as described above. Processing then proceeds to an example subroutine 1310, which is illustrated in FIG. 14.

The subroutine 1310 of FIG. 14 begins execution at block 1312 at which the orchestrator 150 deploys the VM 142 on the compute node 104 to implement the workload 140 at the compute node 104. At block 1314, the orchestrator 150 sends a test traffic file for the workload 140 to the network node configurator 138, as described above. At block 1316, the network node configurator 138 receives, from the central network configurator 154, the updated TSN schedule and the set(s) of constraints parsed from VIFD 158, and initiates deployment of the duplicate softswitch 206, as described above. At block 1318, the central network configurator 154 deploys, as described above, the duplicate softswitch 206 based on (e.g., to match) the configuration specification obtained for the existing softswitch 106 from the softswitch specification repository included in the repositories 146 (represented by block 1320 in FIG. 14).

At block 1322, the network node configurator 138 connects the VM 142 implementing the new workload 140 to the duplicate softswitch 205 and sets the workload 140 hosted by the VM 142 to test mode, as described above. At block 1324, the network node configurator 138 invokes the traffic simulator 305 to apply simulated network traffic to the duplicate softswitch 205 to validate the updated TSN schedule, as described above. As described above, the simulated network traffic is obtained from the simulated network traffic repository included in the repositories 146 (represented by block 1326 in FIG. 14). As described above, the simulated network traffic is collected by one or more virtual network sinks which determine traffic performance metrics associated with the simulated network traffic processed by the duplicate softswitch 205 based on the updated TSN schedule (block 1328). At block 1330, the network node configurator 138 also monitors switch metrics associated with processing of the simulated network traffic by the duplicate softswitch 205, as described above. When the simulated network traffic is complete (block 1332), processing proceeds to block 1334.

At block 1334, the network node configurator 138 compares, as described above, the monitored metrics with the first set of constraints (e.g., hard constraints) obtained from the workload scheduling and metrics specification repository included in the repositories 146 (represented by block 1336 in FIG. 14). At block 1338, the network node configurator 138 determines, as described above, whether the first set of constraints (e.g., hard constraints) is met and, thus, whether the updated TSN schedule is valid. If the updated TSN schedule is not valid because one or of the first set of constraints was not met (block 1338), then processing returns from the subroutine 1332 (represented by block 1340 in FIG. 14). However, if the updated TSN schedule is valid (block 1338), then at block 1342, the network node configurator 138 adjusts the configuration of the new softswitch 205 to cause one or more of the second set of constraints (e.g., soft constraints) obtained from the workload scheduling and metrics specification repository to be met. At block 1344, the network node configurator 138 continues to iteratively adjust perform such constraint optimization until the second set of constraints (e.g., soft constraints) is met or the bounded time limit is met, as described above. Processing then returns from the subroutine 1332 (represented by block 1340 in FIG. 14).

Returning to FIG. 13, at block 1346, the network node configurator 138 causes processing to proceed to block 1348 if the updated TSN schedule is determined not to be valid, and causes processing to proceed to block 1350 if the updated TSN schedule is determined to be valid. At block 1348, the network node configurator 138 generates a deployment failure message and transmits the failure message to the central configuration controller 102, as described above. At block 1352, the orchestrator 150 and the central user configurator 152 receive the deployment failure message. At block 1354, the orchestrator 150 and the central user configurator 152 deletes the VM 142 implementing the workload 140 and the updated TSN schedule, as described above.

Conversely, at block 1350, the network node configurator 138 adds respective new port connections to the corresponding existing VMs/containers 128, 130, 132 implementing the existing workloads 108, 110, 112 on the compute node 104, binds the new port connections of the VMs/containers 128, 130, 132 to the new softswitch 205, and deletes the prior port connections of the VMs/containers 128, 130, 132 that connected to the softswitch 106, as described above. At block 1358, the network node configurator 138 deletes the softswitch 106 from the compute node 104, as described above, and deletes the configuration specification for the softswitch 106 from the softswitch specification repository included in the repositories 146 (represented by block 1360 of FIG. 13.) At block 1362, the network node configurator 138 invokes the traffic simulator 305 to monitor, as described above, the network traffic processed by the new softswitch 205 based on the updated TSN schedule to generate new simulated network traffic to store in the simulated network traffic repository included in the repositories 146 (represented by block 1364 of FIG. 13).

Figure 15:
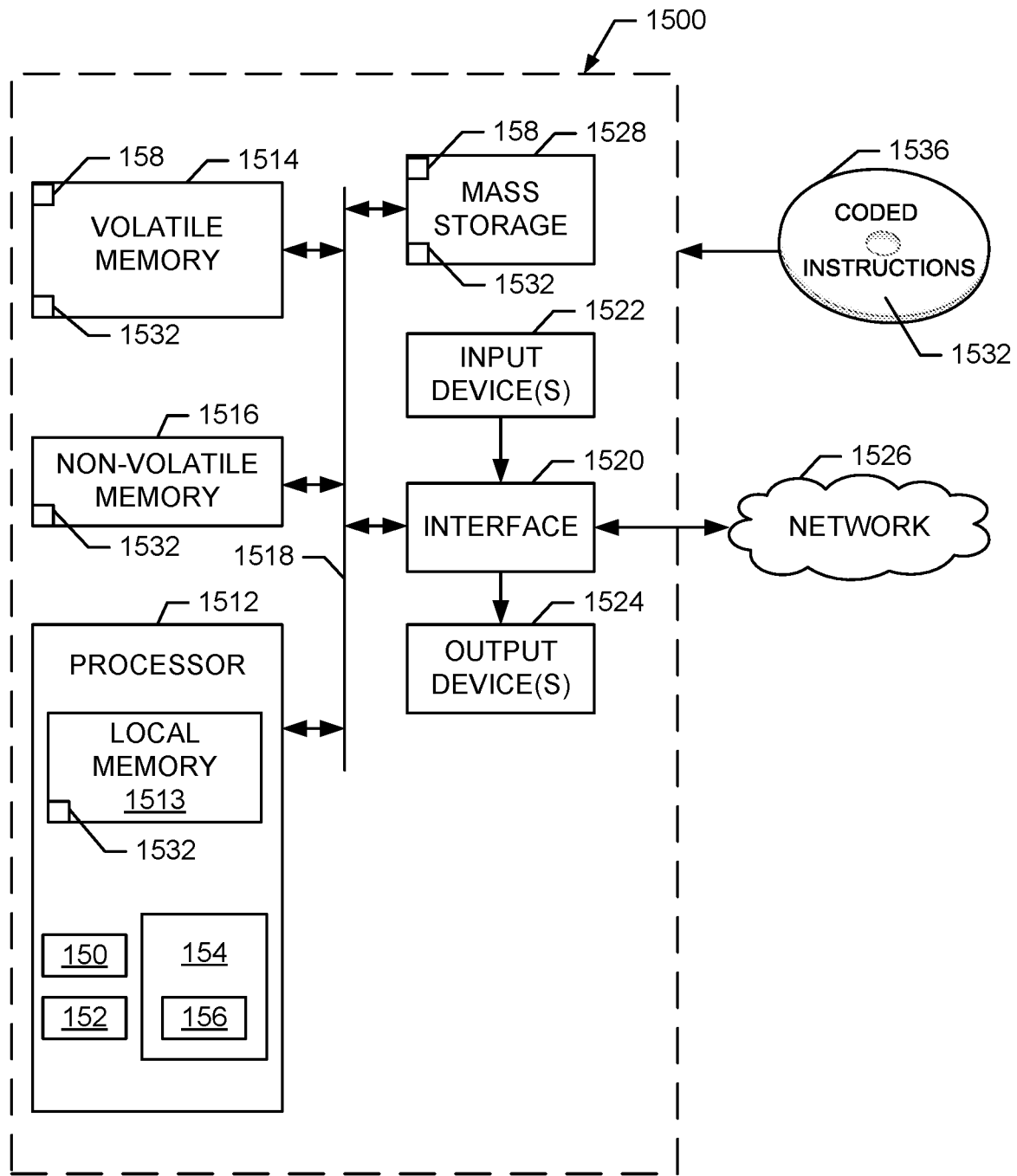
FIG. 15 is a block diagram of an example processor platform structured to execute the example computer readable instructions of FIGS. 8, 13 and/or 14 to implement the example central configuration controller of FIG. 1.

FIG. 15 is a block diagram of an example processor platform 1500 structured to execute the instructions of FIGS. 8, 13 and/or 14 to implement the example central configuration controller of FIG. 1. The processor platform 1500 can be, for example, a server, a personal computer, a workstation, a self-learning machine (e.g., a neural network), a mobile device (e.g., a cell phone, a smart phone, a tablet such as an iPad') or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor 1512 may be a semiconductor based (e.g., silicon based) device. In this example, the processor 1512 implements the orchestrator 150, the central user configurator 152, the central network configurator 154 and the scheduler 156.

The processor 1512 of the illustrated example includes a local memory 1513 (e.g., a cache). The processor 1512 of the illustrated example is in communication with a main memory including a volatile memory 1514 and a non-volatile memory 1516 via a link 1518. The link 1518 may be implemented by a bus, one or more point-to-point connections, etc., or a combination thereof. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1500, can allow the user to control the computer system and provide data to the computer using physical gestures, such as, but not limited to, hand or body movements, facial expressions, and face recognition.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speakers(s). The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526, such as the network 145. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives. In some examples, the volatile memory 1514 and/or the mass storage device 1528 may store the VIFDs processed by the central configuration controller 102.

The machine executable instructions 1532 corresponding to the instructions of FIGS. 8, 13 and/or 14 may be stored in the mass storage device 1528, in the volatile memory 1514, in the non-volatile memory 1516, in the local memory 1513 and/or on a removable non-transitory computer readable storage medium, such as a CD or DVD 1536.

Figure 16:
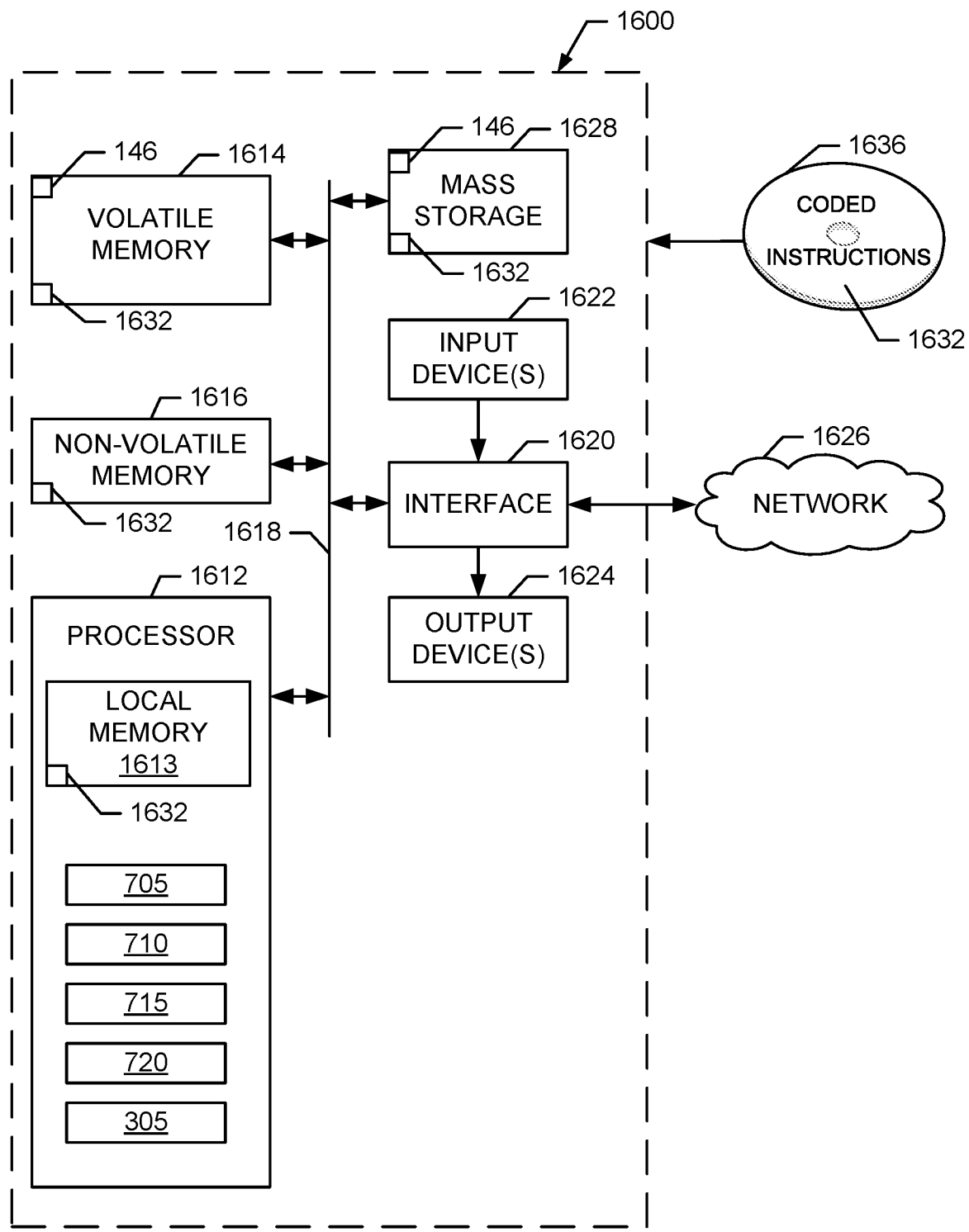
FIG. 16 is a block diagram of an example processor platform structured to execute the example computer readable instructions of FIGS. 9, 10, 11, 12, 13 and/or 14 to implement the example network node configurator of FIGS. 1-5 and/or 7.

FIG. 16 is a block diagram of an example processor platform 1600 structured to execute the instructions of FIGS. 9, 10, 11, 12, 13 and/or 14 to implement the example network node configurator 138 of FIGS. 1-5 and/or 7. The processor platform 1600 can be, for example, a server, a personal computer, a workstation, a self-learning machine (e.g., a neural network), a mobile device (e.g., a cell phone, a smart phone, a tablet such as an iPad™) or any other type of computing device.

The processor platform 1600 of the illustrated example includes a processor 1612. The processor 1612 of the illustrated example is hardware. For example, the processor 1612 can be implemented by one or more integrated circuits, logic circuits, microprocessors, GPUs, DSPs, or controllers from any desired family or manufacturer. The hardware processor 1612 may be a semiconductor based (e.g., silicon based) device. In this example, the processor 1612 implements the traffic simulator 305, the softswitch instantiator 705, the TSN schedule configure 710, the TSN schedule validator 715 and the softswitch replacer 720.

The processor 1612 of the illustrated example includes a local memory 1613 (e.g., a cache). The processor 1612 of the illustrated example is in communication with a main memory including a volatile memory 1614 and a non-volatile memory 1616 via a link 1618. The link 1618 may be implemented by a bus, one or more point-to-point connections, etc., or a combination thereof. The volatile memory 1614 may be implemented by SDRAM, DRAM, RDRAM® and/or any other type of random access memory device. The non-volatile memory 1616 may be implemented by flash memory and/or any other desired type of memory device. Access to the main memory 1614, 1616 is controlled by a memory controller.

The processor platform 1600 of the illustrated example also includes an interface circuit 1620. The interface circuit 1620 may be implemented by any type of interface standard, such as an Ethernet interface, a USB, a Bluetooth® interface, an NFC interface, and/or a PCI express interface.

In the illustrated example, one or more input devices 1622 are connected to the interface circuit 1620. The input device(s) 1622 permit(s) a user to enter data and/or commands into the processor 1612. The input device(s) can be implemented by, for example, an audio sensor, a microphone, a camera (still or video), a keyboard, a button, a mouse, a touchscreen, a track-pad, a trackball, a trackbar (such as an isopoint), a voice recognition system and/or any other human-machine interface. Also, many systems, such as the processor platform 1600, can allow the user to control the computer system and provide data to the computer using physical gestures, such as, but not limited to, hand or body movements, facial expressions, and face recognition.

One or more output devices 1624 are also connected to the interface circuit 1620 of the illustrated example. The output devices 1624 can be implemented, for example, by display devices (e.g., an LED, an OLED, an LCD, a CRT display, an IPS display, a touchscreen, etc.), a tactile output device, a printer and/or speakers(s). The interface circuit 1620 of the illustrated example, thus, typically includes a graphics driver card, a graphics driver chip and/or a graphics driver processor.

The interface circuit 1620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1626, such as the network 145. The communication can be via, for example, an Ethernet connection, a DSL connection, a telephone line connection, a coaxial cable system, a satellite system, a line-of-site wireless system, a cellular telephone system, etc.

The processor platform 1600 of the illustrated example also includes one or more mass storage devices 1628 for storing software and/or data. Examples of such mass storage devices 1628 include floppy disk drives, hard drive disks, compact disk drives, Blu-ray disk drives, RAID systems, and DVD drives. In some examples, the volatile memory 1614 and/or the mass storage device 1628 may implement one or more of the repositories 146.

The machine executable instructions 1632 corresponding to the instructions of FIGS. 9, 10, 11, 12, 13 and/or 14 may be stored in the mass storage device 1628, in the volatile memory 1614, in the non-volatile memory 1616, in the local memory 1613 and/or on a removable non-transitory computer readable storage medium, such as a CD or DVD 1636.

From the foregoing, it will be appreciated that example methods, apparatus and articles of manufacture have been disclosed that change a TSN schedule implemented by a softswitch on a compute node operating in a time sensitive network. Disclosed example methods, apparatus and articles of manufacture improve the efficiency of the compute node by using a duplicate softswitch, also referred to herein as a digital twin softswitch, to enable dynamic changing of the existing TSN schedule implemented by the softswitch executing on the compute node, which may be caused by a new workload being deployed in the time sensitive network, without impacting the deterministic and real-time packet communications associated with existing workloads connected to the softswitch. Disclosed example methods, apparatus and articles of manufacture also utilize the duplicate softswitch (digital twin softswitch) to validate an updated TSN schedule in situ with a new workload being deployed, and can prevent deployment of the updated TSN schedule if a performance issue is detected. Disclosed methods, apparatus and articles of manufacture are accordingly directed to one or more improvement(s) in the functioning of a computer.

The foregoing disclosure provides example solutions to change a time sensitive networking schedule implemented by a softswitch. The following further examples, which include subject matter such as at least one softswitch time sensitive networking schedule changing apparatus, at least one non-transitory computer readable medium including instructions that, when executed, cause at least one processor to change a time sensitive networking schedule implemented by a softswitch, and a softswitch time sensitive networking schedule changing method, are disclosed herein. Disclosed examples can be implemented individually and/or in one or more combinations.

Example 1 is an apparatus to change a time sensitive networking schedule implemented by a first softswitch on a compute node. The apparatus of example 1 includes a network node configurator and a traffic simulator. The network node configurator of example 1 is to (i) deploy a second softswitch on the compute node based on a first configuration specification associated with the first softswitch, (ii) configure the second softswitch to implement an updated time sensitive networking schedule different from the time sensitive networking schedule implemented by the first softswitch, and (iii) replace the first softswitch with the second softswitch in response to a determination that a first set of constraints is met for simulated network traffic processed by the second softswitch based on the updated time sensitive networking schedule. The traffic simulator of example 1 is to apply the simulated network traffic to the second softswitch.

Example 2 includes the subject matter of example 1, wherein the first softswitch is to communicate with respective first ports of corresponding ones of a first set of virtual machines on the compute node to provide the first set of virtual machines with access to a network that implements time sensitive networking, and to replace the first softswitch with the second softswitch, the network node configurator is to: (i) connect the second softswitch to a network interface of the compute node; (ii) add respective second ports to corresponding ones of the first set of virtual machines; (iii) bind the respective second ports of the corresponding ones of the first set of virtual machines to the second softswitch; (iv) delete the respective first ports of the corresponding ones of the first set of virtual machines; and (v) delete the first softswitch from the compute node.

Example 3 includes the subject matter of example 1 or example 2, wherein the updated time sensitive networking schedule is to support deployment of a new virtual machine to the compute node to host a workload, and the network node configurator is to: (i) connect a port of the new virtual machine to the second softswitch; (ii) configure the workload to operate in a test mode; (iii) monitor a metric associated with the simulated network traffic processed by the second softswitch; and (iv) configure the workload to operate in an operational mode after the determination that the first set of constraints is met for the simulated network traffic processed by the second softswitch based on the updated time sensitive networking schedule.

Example 4 includes the subject matter of example 3, wherein the simulated network traffic includes: (i) first simulated network traffic associated with a first set of virtual machines on the compute node, the first set of virtual machines in communication with the first softswitch, the first simulated traffic corresponding to previously monitored network traffic obtained during operation of the first set of virtual machines; and (ii) second simulated network traffic associated with the new virtual machine.

Example 5 includes the subject matter of any one of examples 1 to 4, wherein the network node configurator is to delete the second softswitch and the updated time sensitive networking schedule from the compute node in response to a determination that the first set of constraints is not met for the simulated network traffic processed by the second softswitch based on the updated time sensitive networking schedule.

Example 6 includes the subject matter of any one of examples 1 to 5, wherein the second softswitch is associated with a second configuration specification, the second configuration specification to correspond to the first configuration specification when the second softswitch is initially deployed on the compute node, and in response to the determination that the first set of constraints is met for the simulated network traffic, the network node configurator is to adjust the second configuration of the second softswitch to satisfy at least one of a second set of constraints to be met for the simulated network traffic processed by the second softswitch based on the updated time sensitive networking schedule.

Example 7 includes the subject matter of example 6, wherein the network node configurator is to iteratively adjust the second configuration of the second softswitch to satisfy other ones of the second set of constraints to be met for the simulated network traffic until a time limit is reached.

Example 8 is at least one non-transitory computer readable medium comprising computer readable instructions which, when executed, cause at least one processor to at least: (i) deploy a second softswitch on a compute node based on a first configuration specification associated with a first softswitch on the compute node; (ii) configure the second softswitch to implement a second time sensitive networking schedule different from a first time sensitive networking schedule implemented by the first softswitch; and (iii) replace the first softswitch with the second softswitch in response to a determination that a first set of constraints is met for simulated network traffic processed by the second softswitch based on the second time sensitive networking schedule.

Example 9 includes the subject matter of example 8, wherein the first softswitch is to communicate with respective first ports of corresponding ones of a first set of virtual machines on the compute node to provide the first set of virtual machines with access to a network that implements time sensitive networking, and to replace the first softswitch with the second softswitch, the instructions, when executed, cause the at least one processor to: (i) connect the second softswitch to a network interface of the compute node; (ii) add respective second ports to corresponding ones of the first set of virtual machines; (iii) bind the respective second ports of the corresponding ones of the first set of virtual machines to the second softswitch; (iv) delete the respective first ports of the corresponding ones of the first set of virtual machines; and (v) delete the first softswitch from the compute node.

Example 10 includes the subject matter of example 8 or example 9, wherein the second time sensitive networking schedule is to support deployment of a new virtual machine to the compute node to host a workload, and the instructions, when executed, cause the at least one processor to: (i) connect a port of the new virtual machine to the second softswitch; (ii) configure the workload to operate in a test mode; (iii) monitor a metric associated with the simulated network traffic processed by the second softswitch; and (iv) configure the workload to operate in an operational mode after the determination that the first set of constraints is met for the simulated network traffic processed by the second softswitch based on the second time sensitive networking schedule.

Example 11 includes the subject matter of example 10, wherein the simulated network traffic includes: (i) first simulated network traffic associated with a first set of virtual machines on the compute node, the first set of virtual machines in communication with the first softswitch, the first simulated traffic corresponding to previously monitored network traffic obtained during operation of the first set of virtual machines; and (ii) second simulated network traffic associated with the new virtual machine.

Example 12 includes the subject matter of any one of examples 8 to 11, wherein the instructions, when executed, cause the at least one processor to delete the second softswitch and the second time sensitive networking schedule from the compute node in response to a determination that the first set of constraints is not met for the simulated network traffic processed by the second softswitch based on the second time sensitive networking schedule.

Example 13 includes the subject matter of any one of examples 8 to 12, wherein the second softswitch is associated with a second configuration specification, the second configuration specification to correspond to the first configuration specification when the second softswitch is initially deployed on the compute node, and in response to the determination that the first set of constraints is met for the simulated network traffic, the instructions, when executed, cause the at least one processor to adjust the second configuration of the second softswitch to satisfy at least one of a second set of constraints to be met for the simulated network traffic processed by the second softswitch based on the second time sensitive networking schedule.

Example 14 includes the subject matter of example 13, wherein the instructions, when executed, cause the at least one processor to iteratively adjust the second configuration of the second softswitch to satisfy other ones of the second set of constraints to be met for the simulated network traffic until a time limit is reached.

Example 15 is a method to change a time sensitive networking schedule implemented by a first softswitch on a compute node. The method of claim 15 includes deploying a second softswitch on the compute node based on a first configuration specification associated with the first softswitch. The method of claim 15 also includes configuring the second softswitch to implement an updated time sensitive networking schedule different from the time sensitive networking schedule implemented by the first softswitch. The method of claim 15 further includes replacing the first softswitch with the second softswitch in response to a determination that a first set of constraints is met for simulated network traffic processed by the second softswitch based on the updated time sensitive networking schedule.

Example 16 includes the subject matter of example 15, wherein the first softswitch is to communicate with respective first ports of corresponding ones of a first set of virtual machines on the compute node to provide the first set of virtual machines with access to a network that implements time sensitive networking, and replacing the first softswitch with the second softswitch includes: (i) connecting the second softswitch to a network interface of the compute node; (ii) adding respective second ports to corresponding ones of the first set of virtual machines; (iii) binding the respective second ports of the corresponding ones of the first set of virtual machines to the second softswitch; (iv) deleting the respective first ports of the corresponding ones of the first set of virtual machines; and (v) deleting the first softswitch from the compute node.

Example 17 includes the subject matter of example 15 or example 16, wherein the updated time sensitive networking schedule is to support deployment of a new virtual machine to the compute node to host a workload, and further including: (i) connecting a port of the new virtual machine to the second softswitch; (ii) configuring the workload to operate in a test mode; (iii) monitoring a metric associated with the simulated network traffic processed by the second softswitch; and (iv) configuring the workload to operate in an operational mode after the determination that the first set of constraints is met for the simulated network traffic processed by the second softswitch based on the updated time sensitive networking schedule.

Example 18 includes the subject matter of example 17, wherein the simulated network traffic includes: (i) first simulated network traffic associated with a first set of virtual machines on the compute node, the first set of virtual machines in communication with the first softswitch, the first simulated traffic corresponding to previously monitored network traffic obtained during operation of the first set of virtual machines; and (ii) second simulated network traffic associated with the new virtual machine.

Example 19 includes the subject matter of any one of examples 15 to 18, and further includes deleting the second softswitch and the updated time sensitive networking schedule from the compute node in response to a determination that the first set of constraints is not met for the simulated network traffic processed by the second softswitch based on the updated time sensitive networking schedule.

Example 20 includes the subject matter of any one of examples 15 to 19, wherein the second softswitch is associated with a second configuration specification, the second configuration specification to correspond to the first configuration specification when the second softswitch is initially deployed on the compute node, and in response to the determination that the first set of constraints is met for the simulated network traffic, further including adjusting the second configuration of the second softswitch to satisfy at least one of a second set of constraints to be met for the simulated network traffic processed by the second softswitch based on the updated time sensitive networking schedule.

Example 21 includes the subject matter of example 20, and further includes iteratively adjusting the second configuration of the second softswitch to satisfy other ones of the second set of constraints to be met for the simulated network traffic until a time limit is reached.

Example 22 is an apparatus including means for replacing a first softswitch implementing a first time sensitive networking schedule on a compute node with a second softswitch implementing a second time sensitive networking schedule different from the first time sensitive networking schedule, the means for replacing to: (i) deploy the second softswitch on the compute node based on a first configuration specification associated with the first softswitch; (ii) configure the second softswitch to implement the second time sensitive networking schedule; and (iii) replace the first softswitch with the second softswitch in response to a determination that a first set of constraints is met for simulated network traffic processed by the second softswitch based on the second time sensitive networking schedule. The apparatus of example 22 also includes means for applying the simulated network traffic to the second softswitch.

Example 23 includes the subject matter of example 22, wherein the first softswitch is to communicate with respective first ports of corresponding ones of a first set of virtual machines on the compute node to provide the first set of virtual machines with access to a network that implements time sensitive networking, and the means for replacing is to: (i) connect the second softswitch to a network interface of the compute node; (ii) add respective second ports to corresponding ones of the first set of virtual machines; (iii) bind the respective second ports of the corresponding ones of the first set of virtual machines to the second softswitch; (iv) delete the respective first ports of the corresponding ones of the first set of virtual machines; and (v) delete the first softswitch from the compute node.

Example 24 includes the subject matter of example 22 or example 23, wherein the second time sensitive networking schedule is to support deployment of a new virtual machine to the compute node to host a workload, and the means for replacing is to: (i) connect a port of the new virtual machine to the second softswitch; (ii) configure the workload to operate in a test mode; (iii) monitor a metric associated with the simulated network traffic processed by the second softswitch; and (iv) configure the workload to operate in an operational mode after the determination that the first set of constraints is met for the simulated network traffic processed by the second softswitch based on the second time sensitive networking schedule.

Example 25 includes the subject matter of example 24, wherein the simulated network traffic includes: (i) first simulated network traffic associated with a first set of virtual machines on the compute node, the first set of virtual machines in communication with the first softswitch, the first simulated traffic corresponding to previously monitored network traffic obtained during operation of the first set of virtual machines; and (ii) second simulated network traffic associated with the new virtual machine.

Example 26 includes the subject matter of any one of examples 22 to 25, wherein the means for replacing is to delete the second softswitch and the second time sensitive networking schedule from the compute node in response to a determination that the first set of constraints is not met for the simulated network traffic processed by the second softswitch based on the second time sensitive networking schedule.

Example 27 includes the subject matter of any one of examples 22 to 26, wherein the second softswitch is associated with a second configuration specification, the second configuration specification to correspond to the first configuration specification when the second softswitch is initially deployed on the compute node, and in response to the determination that the first set of constraints is met for the simulated network traffic, the means for replacing is to adjust the second configuration of the second softswitch to satisfy at least one of a second set of constraints to be met for the simulated network traffic processed by the second softswitch based on the second time sensitive networking schedule.

Example 28 includes the subject matter of example 27, wherein the means for replacing is to iteratively adjust the second configuration of the second softswitch to satisfy other ones of the second set of constraints to be met for the simulated network traffic until a time limit is reached.

Example 29 is an apparatus to change a time sensitive networking schedule implemented by a softswitch on a compute node. The apparatus of example 29 includes a central user configurator to parse a virtualized industrial function descriptor corresponding to a virtualized workload to determine a set of parameters for an updated time sensitive networking schedule to be implemented by the softswitch. The apparatus of example 29 also includes a central network configurator to: (i) determine the updated time sensitive networking schedule based on the set of parameters; and (ii) send the updated time sensitive networking schedule to the compute node.

Example 30 includes the subject matter of example 29, and further includes an orchestrator to parse the virtualized industrial function descriptor to determine a virtual machine configuration specification for a virtual machine to deploy on the compute node to host the virtualized workload, and to send the virtual machine configuration specification to the compute node to cause the virtual machine to be deployed on the compute node.

Example 31 includes the subject matter of example 30, wherein the orchestrator is to delete the virtual machine from the compute node in response to a message from the compute node indicating a first set of constraints is not met by the updated time sensitive networking schedule.

Example 32 includes the subject matter of any one of examples 29 to 31, wherein the central user configurator is to delete the updated time sensitive networking schedule in response to a message from the compute node indicating a first set of constraints is not met by the updated time sensitive networking schedule.

Example 33 includes the subject matter of any one of examples 29 to 32, wherein the central user configurator is to: (i) determine whether the central network configurator supports generation of the updated time sensitive networking schedule based on a first one of the set of parameters; and (ii) discard the first one of the set of parameters when the central network configurator does not support generation of the updated time sensitive networking schedule based on the first one of the set of parameters.

Example 34 includes the subject matter of any one of examples 29 to 32, wherein the central user configurator is to: (i) determine whether the central network configurator supports generation of the updated time sensitive networking schedule based on a first one of the set of parameters; and (ii) replace the first one of the set of parameters with a different parameter when the central network configurator does not support generation of the updated time sensitive networking schedule based on the first one of the set of parameters.

Example 35 is at least one non-transitory computer readable medium comprising computer readable instructions which, when executed, cause at least one processor to at least: (i) parse a virtualized industrial function descriptor corresponding to a virtualized workload to determine a set of parameters for a second time sensitive networking schedule to be implemented by a softswitch on a compute node, the second time sensitive networking schedule different from a first time sensitive networking schedule already implemented by the softswitch on the compute node; (ii) determine the second time sensitive networking schedule based on the set of parameters; and (iii) send the second time sensitive networking schedule to the compute node.

Example 36 includes the subject matter of example 35, wherein the instructions, when executed, cause the at least one processor to: (i) parse the virtualized industrial function descriptor to determine a virtual machine configuration specification for a virtual machine to deploy on the compute node to host the virtualized workload; and (ii) send the virtual machine configuration specification to the compute node to cause the virtual machine to be deployed on the compute node.

Example 37 includes the subject matter of example 36, wherein the instructions, when executed, further cause the at least one processor to delete the virtual machine from the compute node in response to a message from the compute node indicating a first set of constraints is not met by the second time sensitive networking schedule.

Example 38 includes the subject matter of example 35 or example 36, wherein the instructions, when executed, cause the at least one processor to delete the second time sensitive networking schedule in response to a message from the compute node indicating a first set of constraints is not met by the second time sensitive networking schedule.

Example 39 is a method to change a time sensitive networking schedule implemented by a softswitch on a compute node. The method of example 39 includes parsing a virtualized industrial function descriptor corresponding to a virtualized workload to determine a set of parameters for an updated time sensitive networking schedule to be implemented by the softswitch. The method of example 39 also includes determining the updated time sensitive networking schedule based on the set of parameters. The method of example 39 further includes sending the updated time sensitive networking schedule to the compute node.

Example 40 includes the subject matter of example 39, and further includes (i) parsing the virtualized industrial function descriptor to determine a virtual machine configuration specification for a virtual machine to deploy on the compute node to host the virtualized workload; and (ii) sending the virtual machine configuration specification to the compute node to cause the virtual machine to be deployed on the compute node.

Example 41 includes the subject matter of example 40, and further includes deleting the virtual machine from the compute node in response to a message from the compute node indicating a first set of constraints is not met by the updated time sensitive networking schedule.

Example 42 includes the subject matter of example 39 or example 40, and further includes deleting the updated time sensitive networking schedule in response to a message from the compute node indicating a first set of constraints is not met by the updated time sensitive networking schedule.

Example 43 is an apparatus including means for parsing a virtualized industrial function descriptor corresponding to a virtualized workload to determine a set of parameters for a second time sensitive networking schedule to be implemented by a softswitch on a compute node, the second time sensitive networking schedule different from a first time sensitive networking schedule already implemented by the softswitch on the compute node. The apparatus of example 43 also includes means for determining the second time sensitive networking schedule based on the set of parameters, the means for determining the second time sensitive networking schedule to send the second time sensitive networking schedule to the compute node.

Example 44 includes the subject matter of example 43, and further includes means for determining a virtual machine configuration specification for a virtual machine to deploy on the compute node to host the virtualized workload, the means for determining the virtual machine configuration specification to: (i) parse the virtualized industrial function descriptor to determine the virtual machine configuration specification; and (ii) send the virtual machine configuration specification to the compute node to cause the virtual machine to be deployed on the compute node.

Example 45 includes the subject matter of example 44, wherein the means for determining the virtual machine configuration specification is further to delete the virtual machine from the compute node in response to a message from the compute node indicating a first set of constraints is not met by the updated time sensitive networking schedule.

Example 46 includes the subject matter of example 43 or example 44, wherein the means for determining the second time sensitive networking schedule is further to delete the second time sensitive networking schedule in response to a message from the compute node indicating a first set of constraints is not met by the second time sensitive networking schedule.

Example 47 includes the subject matter of any one of examples 1 to 7, wherein the second softswitch is a duplicate of the first softswitch when the second softswitch is initially deployed on the compute node by the network node configurator.

Example 48 includes the subject matter of any one of examples 8 to 14, wherein the second softswitch is a duplicate of the first softswitch when the second softswitch is initially deployed on the compute node.

Example 49 includes the subject matter of any one of examples 15 to 21, wherein the second softswitch is a duplicate of the first softswitch when the second softswitch is initially deployed on the compute node.

Example 50 includes the subject matter of any one of examples 22 to 28, wherein the second softswitch is a duplicate of the first softswitch when the second softswitch is initially deployed on the compute node.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to change a time sensitive networking schedule implemented by a first softswitch on a compute node, the apparatus comprising:
   memory; and
   processor circuit to execute computer readable instructions to implement:
   a network node configurator to:
     deploy a second softswitch on the compute node based on a first configuration specification associated with the first softswitch;
     configure the second softswitch to implement an updated time sensitive networking schedule different from the time sensitive networking schedule implemented by the first softswitch; and
     replace the first softswitch with the second softswitch in response to a determination that a first set of constraints is met for simulated network traffic processed by the second softswitch based on the updated time sensitive networking schedule; and
   a traffic simulator to apply the simulated network traffic to the second softswitch.

2. The apparatus of claim 1, wherein the first softswitch is to communicate with respective first ports of corresponding ones of a first set of virtual machines on the compute node to provide the first set of virtual machines with access to a network that implements time sensitive networking, and to replace the first softswitch with the second softswitch, the network node configurator is to:

connect the second softswitch to a network interface of the compute node;

add respective second ports to corresponding ones of the first set of virtual machines;

bind the respective second ports of the corresponding ones of the first set of virtual machines to the second softswitch;

delete the respective first ports of the corresponding ones of the first set of virtual machines; and delete the first softswitch from the compute node.

3. The apparatus of claim 1, wherein the updated time sensitive networking schedule is to support deployment of a new virtual machine to the compute node to host a workload, and the network node configurator is to:

connect a port of the new virtual machine to the second softswitch;

configure the workload to operate in a test mode;

monitor a metric associated with the simulated network traffic processed by the second softswitch; and configure the workload to operate in an operational mode after the determination that the first set of constraints is met for the simulated network traffic processed by the second softswitch based on the updated time sensitive networking schedule.

4. The apparatus of claim 3, wherein the simulated network traffic includes:

first simulated network traffic associated with a first set of virtual machines on the compute node, the first set of virtual machines in communication with the first softswitch, the first simulated traffic corresponding to previously monitored network traffic obtained during operation of the first set of virtual machines; and second simulated network traffic associated with the new virtual machine.

5. The apparatus of claim 1, wherein the network node configurator is to delete the second softswitch and the updated time sensitive networking schedule from the compute node in response to a determination that the first set of constraints is not met for the simulated network traffic processed by the second softswitch based on the updated time sensitive networking schedule.

6. The apparatus of claim 1, wherein the second softswitch is associated with a second configuration specification, the second configuration specification to correspond to the first configuration specification when the second softswitch is initially deployed on the compute node, and in response to the determination that the first set of constraints is met for the simulated network traffic, the network node configurator is to adjust the second configuration specification of the second softswitch to satisfy at least one of a second set of constraints to be met for the simulated network traffic processed by the second softswitch based on the updated time sensitive networking schedule.

7. The apparatus of claim 6, wherein the network node configurator is to iteratively adjust the second configuration specification of the second softswitch to satisfy other ones of the second set of constraints to be met for the simulated network traffic until a time limit is reached.

8. The apparatus of claim 1, wherein the second softswitch is a duplicate of the first softswitch when the second softswitch is initially deployed on the compute node by the network node configurator.

9. At least one non-transitory computer readable medium comprising computer readable instructions which, when executed, cause at least one processor to at least:

deploy a second softswitch on a compute node based on a first configuration specification associated with a first softswitch on the compute node;

configure the second softswitch to implement a second time sensitive networking schedule different from a first time sensitive networking schedule implemented by the first softswitch; and replace the first softswitch with the second softswitch in response to a determination that a first set of constraints is met for simulated network traffic processed by the second softswitch based on the second time sensitive networking schedule.

10. The at least one non-transitory computer readable medium of claim 9, wherein the first softswitch is to communicate with respective first ports of corresponding ones of a first set of virtual machines on the compute node to provide the first set of virtual machines with access to a network that implements time sensitive networking, and to replace the first softswitch with the second softswitch, the instructions, when executed, cause the at least one processor to:

connect the second softswitch to a network interface of the compute node;

add respective second ports to corresponding ones of the first set of virtual machines;

bind the respective second ports of the corresponding ones of the first set of virtual machines to the second softswitch;

delete the respective first ports of the corresponding ones of the first set of virtual machines; and delete the first softswitch from the compute node.

11. The at least one non-transitory computer readable medium of claim 9, wherein the second time sensitive networking schedule is to support deployment of a new virtual machine to the compute node to host a workload, and the instructions, when executed, cause the at least one processor to:

connect a port of the new virtual machine to the second softswitch;

configure the workload to operate in a test mode;

monitor a metric associated with the simulated network traffic processed by the second softswitch; and configure the workload to operate in an operational mode after the determination that the first set of constraints is met for the simulated network traffic processed by the second softswitch based on the second time sensitive networking schedule.

12. The at least one non-transitory computer readable medium of claim 9, wherein the second softswitch is associated with a second configuration specification, the second configuration specification to correspond to the first configuration specification when the second softswitch is initially deployed on the compute node, and in response to the determination that the first set of constraints is met for the simulated network traffic, the instructions, when executed, cause the at least one processor to adjust the second configuration specification of the second softswitch to satisfy at least one of a second set of constraints to be met for the simulated network traffic processed by the second softswitch based on the second time sensitive networking schedule.

13. The at least one non-transitory computer readable medium of claim 12, wherein the instructions, when executed, cause the at least one processor to iteratively adjust the second configuration specification of the second softswitch to satisfy other ones of the second set of constraints to be met for the simulated network traffic until a time limit is reached.

14. The at least one non-transitory computer readable medium of claim 9, wherein the second softswitch is a duplicate of the first softswitch when the second softswitch is initially deployed on the compute node.

15. A method to change a time sensitive networking schedule implemented by a first softswitch on a compute node, the method comprising:
deploying a second softswitch on the compute node based on a first configuration specification associated with the first softswitch;
configuring the second softswitch to implement an updated time sensitive networking schedule different from the time sensitive networking schedule implemented by the first softswitch; and
replacing the first softswitch with the second softswitch in response to a determination that a first set of constraints is met for simulated network traffic processed by the second softswitch based on the updated time sensitive networking schedule.

16. The method of claim 15, wherein the first softswitch is to communicate with respective first ports of corresponding ones of a first set of virtual machines on the compute node to provide the first set of virtual machines with access to a network that implements time sensitive networking, and replacing the first softswitch with the second softswitch includes:
connecting the second softswitch to a network interface of the compute node;
adding respective second ports to corresponding ones of the first set of virtual machines;
binding the respective second ports of the corresponding ones of the first set of virtual machines to the second softswitch;
deleting the respective first ports of the corresponding ones of the first set of virtual machines; and
deleting the first softswitch from the compute node.

17. The method of claim 15, wherein the updated time sensitive networking schedule is to support deployment of a new virtual machine to the compute node to host a workload, and further including:
connecting a port of the new virtual machine to the second softswitch;
configuring the workload to operate in a test mode;
monitoring a metric associated with the simulated network traffic processed by the second softswitch; and
configuring the workload to operate in an operational mode after the determination that the first set of constraints is met for the simulated network traffic processed by the second softswitch based on the updated time sensitive networking schedule.

18. The method of claim 15, wherein the second softswitch is associated with a second configuration specification, the second configuration specification to correspond to the first configuration specification when the second softswitch is initially deployed on the compute node, and in response to the determination that the first set of constraints is met for the simulated network traffic, further including adjusting the second configuration specification of the second softswitch to satisfy at least one of a second set of constraints to be met for the simulated network traffic processed by the second softswitch based on the updated time sensitive networking schedule.

19. The method of claim 18, wherein the second softswitch is a duplicate of the first softswitch when the second softswitch is initially deployed on the compute node.

20. An apparatus comprising:
means for replacing a first softswitch implementing a first time sensitive networking schedule on a compute node with a second softswitch implementing a second time sensitive networking schedule different from the first time sensitive networking schedule, the means for replacing to:
deploy the second softswitch on the compute node based on a first configuration specification associated with the first softswitch;
configure the second softswitch to implement the second time sensitive networking schedule; and
replace the first softswitch with the second softswitch in response to a determination that a first set of constraints is met for simulated network traffic processed by the second softswitch based on the second time sensitive networking schedule; and
means for applying the simulated network traffic to the second softswitch.

21. The apparatus of claim 20, wherein the first softswitch is to communicate with respective first ports of corresponding ones of a first set of virtual machines on the compute node to provide the first set of virtual machines with access to a network that implements time sensitive networking, and the means for replacing is to:
connect the second softswitch to a network interface of the compute node;
add respective second ports to corresponding ones of the first set of virtual machines;
bind the respective second ports of the corresponding ones of the first set of virtual machines to the second softswitch;
delete the respective first ports of the corresponding ones of the first set of virtual machines; and
delete the first softswitch from the compute node.

22. The apparatus of claim 20, wherein the second time sensitive networking schedule is to support deployment of a new virtual machine to the compute node to host a workload, and the means for replacing is to:
connect a port of the new virtual machine to the second softswitch;
configure the workload to operate in a test mode;
monitor a metric associated with the simulated network traffic processed by the second softswitch; and
configure the workload to operate in an operational mode after the determination that the first set of constraints is met for the simulated network traffic processed by the second softswitch based on the second time sensitive networking schedule.

23. The apparatus of claim 20, wherein the second softswitch is associated with a second configuration specification, the second configuration specification to correspond to the first configuration specification when the second softswitch is initially deployed on the compute node, and in response to the determination that the first set of constraints is met for the simulated network traffic, the means for replacing is to adjust the second configuration specification of the second softswitch to satisfy at least one of a second set of constraints to be met for the simulated network traffic processed by the second softswitch based on the second time sensitive networking schedule.

24. The apparatus of claim 23, wherein the means for replacing is to iteratively adjust the second configuration specification of the second softswitch to satisfy other ones of the second set of constraints to be met for the simulated network traffic until a time limit is reached.

25. The apparatus of claim 20, wherein the second softswitch is a duplicate of the first softswitch when the second softswitch is initially deployed on the compute node.

* * * * *